US011370249B2

(12) United States Patent
Wilson et al.

(10) Patent No.: US 11,370,249 B2
(45) Date of Patent: Jun. 28, 2022

(54) NON-PNEUMATIC WHEEL

(71) Applicants:Compagnie Generale des Etablissements Michelin, Clermont-Ferrand (FR); Clifford Wilson, Simpsonville, SC (US); Clayton Bohn, Jr., Mauldin, SC (US); Steven M Cron, Simpsonville, SC (US); Timothy Brett Rhyne, Greenville, SC (US)

(72) Inventors: Clifford Wilson, Simpsonville, SC (US); Clayton Bohn, Jr., Mauldin, SC (US); Steven M Cron, Simpsonville, SC (US); Timothy Brett Rhyne, Greenville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 281 days.

(21) Appl. No.: 16/646,415

(22) PCT Filed: Sep. 11, 2018

(86) PCT No.: PCT/US2018/050479
§ 371 (c)(1),
(2) Date: Mar. 11, 2020

(87) PCT Pub. No.: WO2019/051493
PCT Pub. Date: Mar. 14, 2019

(65) Prior Publication Data
US 2020/0276866 A1 Sep. 3, 2020

Related U.S. Application Data

(63) Continuation of application No. PCT/US2017/051012, filed on Sep. 11, 2017.

(51) Int. Cl.
*B60C 7/18* (2006.01)
*B60C 7/14* (2006.01)
(Continued)

(52) U.S. Cl.
CPC ............... *B60C 7/18* (2013.01); *B60C 7/146* (2021.08); *B60B 5/02* (2013.01); *B60B 9/26* (2013.01); *B60C 2001/0091* (2013.01)

(58) Field of Classification Search
CPC ..... B60C 2001/0091; B60C 7/14; B60C 7/18; B60C 7/146; B60C 7/107; B60B 5/02; B60B 9/26
See application file for complete search history.

(56) References Cited

U.S. PATENT DOCUMENTS 1,095,600 A * 5/1914 Sackett ................ B60B 9/26
152/80
1,349,019 A * 8/1920 Timberlake ............ B60B 9/26
152/80
(Continued)

FOREIGN PATENT DOCUMENTS

FR 334354 A * 12/1903
FR 2519910 A * 7/1983 ............... B60B 5/02
(Continued)

OTHER PUBLICATIONS

International Search Report and Written Opinion dated Apr. 1, 2018.

*Primary Examiner* — Kip T Kotter
(74) *Attorney, Agent, or Firm* — John Steckler Schwab

(57) ABSTRACT

A non-pneumatic wheel having a hub (12), an outer tread band (200) and a plurality of spokes (100) connecting the hub (12) with the outer tread band (200), each of the plurality of spokes (10) having first and second support
(Continued)

elements joined by a first elastomeric joint body (130) connecting the first support element to the second support element.

20 Claims, 12 Drawing Sheets

(51) Int. Cl.
  *B60C 1/00* (2006.01)
  *B60B 5/02* (2006.01)
  *B60B 9/26* (2006.01)

(56) References Cited

U.S. PATENT DOCUMENTS

| | | | | |
|---|---|---|---|---|
| 2,742,941 | A * | 4/1956 | Johnson | B60C 7/12 |
| | | | | D11/86 |
| 5,358,210 | A * | 10/1994 | Simon | F16F 3/12 |
| | | | | 248/630 |
| 7,013,939 | B2 * | 3/2006 | Rhyne | B60B 1/042 |
| | | | | 152/5 |
| 10,654,318 | B2 * | 5/2020 | Kim | B60C 7/143 |

FOREIGN PATENT DOCUMENTS

| | | | | |
|---|---|---|---|---|
| WO | WO-2010012091 | A1 * | 2/2010 | B60B 9/04 |
| WO | WO-2013152067 | A1 * | 10/2013 | B60B 1/0253 |
| WO | WO-2017116389 | A1 * | 7/2017 | B29C 65/08 |
| WO | WO-2017117587 | A1 * | 7/2017 | B60B 9/26 |

\* cited by examiner

NON-PNEUMATIC WHEEL

BACKGROUND OF THE INVENTION

Field of the Invention

This invention relates generally to a support structure for a tire and more specifically, to useful rubber compositions for forming the structure.

Description of the Related Art

The details and benefits of non-pneumatic tire constructions are described e.g., in U.S. Pat. Nos. 6,769,465; 6,994,134; 7,013,939; and 7,201,194. Certain non-pneumatic tire constructions propose incorporating a shear band and spokes, embodiments of which are described in e.g., U.S. Pat. No. 7,201,194, which is incorporated herein by reference. Such non-pneumatic tires provide advantages in tire performance without relying upon a gas inflation pressure for support of the loads applied to the tire.

By way of background, FIG. 1 provides a cross-sectional view of an exemplary embodiment of a non-pneumatic tire 106 incorporating a shear band 110. Tire 106 also includes a plurality of tension transmitting elements, illustrated as web spokes 150, extending transversely across and inward from shear band 110. A mounting band 160 is disposed at the radially inner end of the web spokes. The mounting band 160 anchors the tire 106 to a hub 12. A tread portion 105 is formed at the outer periphery of the shear band 110 and may include e.g., grooves or ribs thereon.

The shear band 110 of tire 106 includes a shear layer as well as an innermost reinforcement layer adhered to the radially innermost extent of the shear layer and an outermost reinforcement layer adhered to the radially outermost extent of the shear layer. The reinforcement layers have a tensile stiffness that is greater than the shear stiffness of the shear layer so that the shear band undergoes shear deformation under vertical load.

Work continues to provide non-pneumatic tires with improved properties, such as wear, handling, noise and durability just as such improvements are sought in pneumatic tires.

SUMMARY OF THE INVENTION

Particular embodiments of the present invention include spokes that are suitable for use in non-pneumatic tires or other apparatus that utilizes spokes. Such spokes are useful for connecting a hub to a band and may include a first support element extending from the hub and a second support element extending from the band that are positioned to form an interior angle between a first side of the first support element and a first side of the second support element, wherein the first and second support elements comprise a coating of a first rubber composition.

Such spokes may further include a first elastomeric joint body formed of a second rubber composition and positioned within the interior angle and connecting the distal ends of the first and second support elements; a second elastomeric joint body comprising the third rubber composition and connecting a second side of the first support element at its proximal end to the hub; and a third elastomeric joint body comprising the fourth rubber composition and connecting a second side of the second support element at its proximal end to the band, wherein the proximal ends of the first and second support elements are otherwise free ends.

The rubber compositions may be based on a cross-linkable rubber compositions, the first rubber composition comprising, in parts by weight per 100 parts by weight of rubber (phr) and the first rubber composition may include between 50 phr and 100 phr of natural rubber, between 0 phr and 50 phr of a second rubber component selected from the group consisting of polybutadiene rubber, a copolymer of polybutadiene and styrene wherein the copolymer has no more than 5 mol % styrene and combinations thereof, and between 25 phr and 40 phr of a first reinforcing filler that comprises a first carbon black and a first silica at a carbon black to silica ratio of between 60/40 and 30/70 by weight percent, wherein the first carbon black has a surface area of between 19 $m^2/g$ and 39 $m^2/g$.

The second, third and fourth rubber compositions, which may be the same or different, may include between 50 phr and 100 phr of natural rubber; between 0 phr and 50 phr of a third rubber component selected from the group consisting of polybutadiene rubber, a copolymer of polybutadiene and styrene wherein the copolymer has no more than 5 mol % styrene and combinations thereof; and between 15 phr and 40 phr of a second reinforcing filler that comprises between 2 phr and 6 phr of a second carbon black and between 20 phr and 40 phr of a second silica, wherein the second carbon black has a surface area of between 19 $m^2/g$ and 39 $m^2/g$. Each rubber composition includes a cure system, which cure systems may be the same or different.

The foregoing and other objects, features and advantages of the invention will be apparent from the following more detailed descriptions of particular embodiments of the invention, as illustrated in the accompanying drawing wherein like reference numbers represent like parts of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF PARTICULAR EMBODIMENTS

Figure 1:
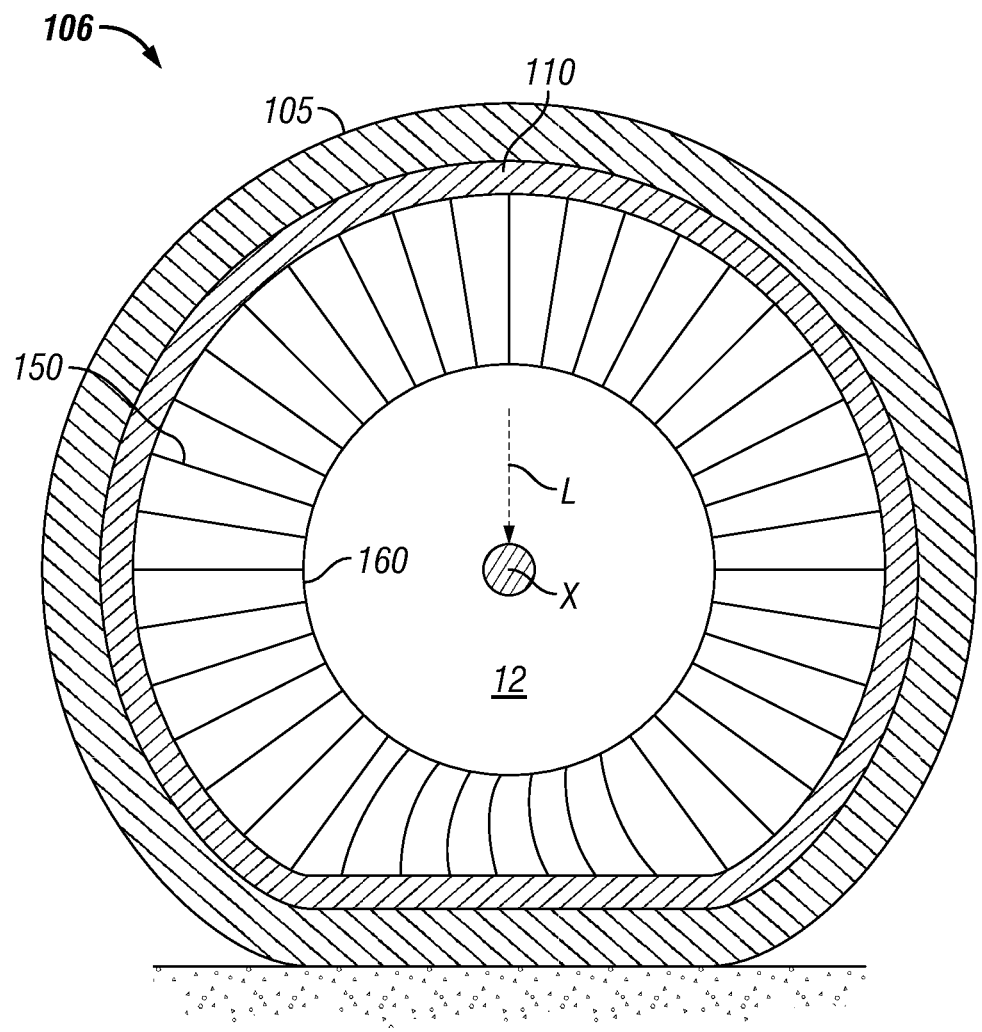
FIG. 1 provides a lateral side view of a prior art non-pneumatic tire.

Embodiments of the present invention include spokes that are useful for non-pneumatic tires and more specifically, spokes that are formed at least in part of an elastomeric material, such as rubber. As noted above, the concept of non-pneumatic tires that use spokes to transmit a load between the hub and the outer tread band is well known in the industry. An improvement to the spokes that are disclosed herein provides increased durability and reduced rolling resistance for a non-pneumatic tire—and therefore improved fuel economy—when included in a non-pneumatic tire.

More generally embodiments of the present invention provide a mechanical structure for resiliently supporting a load. As described more fully below, the spokes disclosed herein have a V-shaped form and extend between a hub and a band; typically embodiments of non-pneumatic tires may include an outer band having the shear band and the tread. Each leg or support element forming the V-shaped spoke includes a coating of a rubber composition and in particular embodiments, the proximal end of each leg is attached to the hub or tread band, respectively, with an elastomeric joint body formed of an ultra-low hysteresis rubber composition. An ultra-low rubber composition also forms an elastomeric joint body that is positioned within the V-shaped interior angle of the spoke that connects the distal ends of the legs, i.e., the ends opposite to the proximal ends.

As previously noted, the spokes disclosed herein provide improved rolling resistance and improved durability of a non-pneumatic tire over other materials that have been found to be suitable for use in making spokes for non-pneumatic tires. To further improve the durability, particular embodiments of the present invention may further provide that the elastomeric joint bodies that attach the proximal ends of the spokes to the hub and band include a heel that is formed at their proximal ends and manufactured of a rubber composition as further discussed below.

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

The following terms are defined as follows for this disclosure:

"Axial direction" or the letter "A" in the figures refers to a direction parallel to the axis of rotation of for example, the shear band, tire, and/or wheel as it travels along a road surface.

"Radial direction" or the letter "R" in the figures refers to a direction that is orthogonal to the axial direction and extends in the same direction as any radius that extends orthogonally from the axial direction.

"Equatorial plane" means a plane that passes perpendicular to the axis of rotation and bisects the outer tread band and/or wheel structure.

"Circumferential direction" or the letter "C" in the figures refers to a direction is orthogonal to the axial direction and orthogonal to a radial direction.

"Forward direction of travel" or the letter "F" in the figures refers to the direction the tire was designed to predominantly travel in for aesthetics and or performance reasons. Travel in a direction different than the forward direction of travel is possible and anticipated.

"Direction of rotation" or the letter "D" in the figures refers to the direction the tire was designed to predominantly rotate in for aesthetics and/or performance reasons. Rotation in a direction opposite than the direction of rotation is possible and anticipated.

"Radial plane" means a plane that passes perpendicular to the equatorial plane and through the axis of rotation of the wheel.

"Lateral direction" or the letter "L" means a direction that is orthogonal to an equatorial plane.

"Elastic material" or "Elastomer" as used herein refers to a polymer exhibiting rubber-like elasticity, such as a material comprising rubber.

"Elastomeric" as used herein refers to a material comprising an elastic material or elastomer, such as a material comprising rubber.

"Interior angle" or "Internal angle" as used herein means an angle formed between two surfaces that is greater than 0 degrees but less than 180 degrees. An acute angle, a right angle and an obtuse angle would all be considered "interior angles" as the term is used herein.

"Exterior angle" or "External angle" or "Reflex angle" as used herein means an angle formed between two surfaces that is greater than 180 degrees but less than 360 degrees.

"Deflectable" means able to be bent resiliently.

"Nominal load" or "desired design load" is a load for which the structure is designed to carry. More specifically, when used in the context of a wheel or tire, "nominal load" refers to the load for which the wheel or tire is designed to carry and operate under. The nominal load or desired design load includes loads up to and including the maximum load specified by the manufacturer and, in the case of a vehicle tire, often indicated by marking on the side of a the tire. A loading condition in excess of the nominal load may be sustained by the structure, but with the possibility of structural damage, accelerated wear, or reduced performance. A loading condition of less than nominal load, but more than an unloaded state, may be considered a nominal load, though deflections will likely be less than deflections at nominal load.

"Modulus" or "Modulus of elongation" (MPa) was measured at 10% (MA10) at a temperature of 23° C. based on ASTM Standard D412 on dumb bell test pieces. The measurements were taken in the second elongation; i.e., after an accommodation cycle. These measurements are secant moduli in MPa, based on the original cross section of the test piece.

As used herein, "phr" is "parts per hundred parts of rubber by weight" and is a common measurement in the art wherein components of a rubber composition are measured relative to the total weight of rubber in the composition, i.e., parts by weight of the component per 100 parts by weight of the total rubber(s) in the composition.

As used herein, "based upon" is a term recognizing that embodiments of the present invention are made of vulcanized or cured rubber compositions that were, at the time of their assembly, uncured. The cured rubber composition is therefore "based upon" the uncured rubber composition. In other words, the cross-linked rubber composition is based upon or comprises the constituents of the cross-linkable rubber composition.

The Architecture of an Exemplary Non-Pneumatic Tire.

Figure 2:
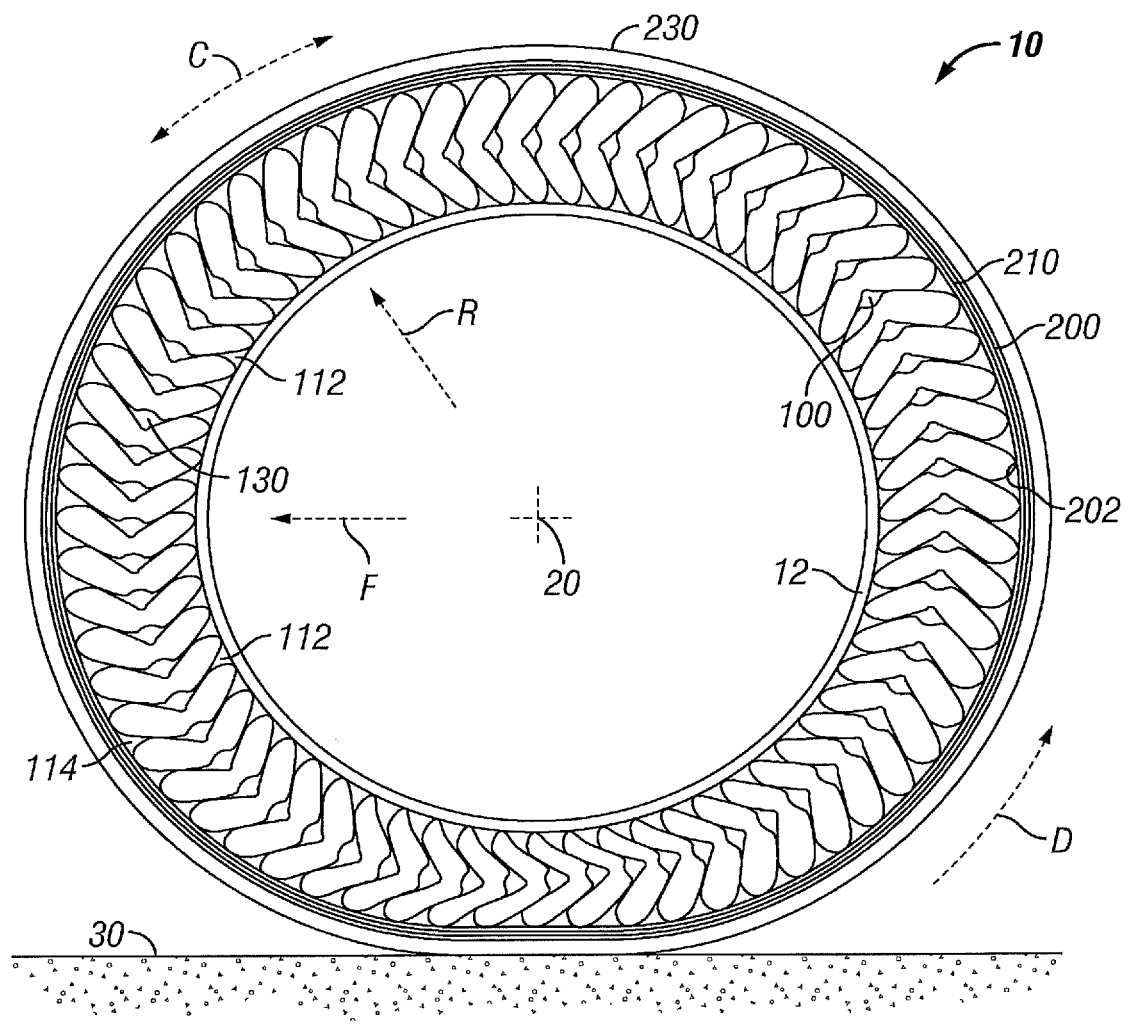
FIG. 2 provides a lateral side view of an exemplary embodiment of the present invention wherein a plurality of resilient composite structures are configured as spokes forming a part of a tire under nominal loading conditions.

FIG. 2 shows a lateral side view of an exemplary embodiment of the present invention wherein a plurality of resilient composite structures are configured as spokes 100 and are attached to an outer tread band 200 forming a part of a tire 10. The tire 10 may be incorporated into a wheel. For example the tire 10 may be part of non-pneumatic wheel having a hub 12 which is attached to a passenger vehicle allowing the vehicle to roll across a ground surface. Other objects and vehicles may incorporate the invention, including but not limited to: heavy duty truck, trailer, light truck, off-road, ATV, bus, aircraft, agricultural, mining, bicycle, motorcycle and passenger vehicle tires. Such a non-pneumatic wheel would possess a hub 12 that would have a radially outer surface having an axis of revolution about a central axis 20. The tire 10 may be attached to the hub 12 by any of a number of methods, for example, by mechanical fasteners such as bolts, screws, clamps or slots, and/or by adhesives such as cyanoacrylates, polyurethane adhesives, and/or by other bonding materials or a combination thereof.

The tire 10 shown here possesses an axis of rotation 20 about which the tire 10 rotates. In this exemplary embodiment, the radially outer surface 230 of the outer tread band 200 interfaces with a ground surface 30 over which the tire rolls. Under a nominal load, the spokes 100 of the tire flex as the tire enter and exit the contact patch. Smaller deflections occur in the spokes 100 as the spoke rotates about the axis 20 outside the contact patch, but most of the deflection occurs while the spoke 100 enters, exits and travels through the contact patch.

Each spoke 100 possesses a "nose" portion 130 which acts as a resilient hinge. The "nose" portion 130 is an elastomeric joint body connecting a support element forming the radially inner portion of the spoke and a support element forming the radially outer portion of the spoke. The support elements, or legs of the spoke 100 are initially positioned at an angle relative to each other. The angle between the spoke support elements measuring less than 180 degrees is the interior angle and the angle between the spoke support elements measuring greater than 180 degrees is the exterior angle. The elastomeric joint is comprised of an elastomer attached to each spoke support element and is positioned on the side of the spoke elements on the interior angle side.

The radially inner portion of the spoke possesses a radially inner foot 112 which connects to another surface, which is the radially outer surface of the hub 12 in the present embodiment. In the present embodiment, the radially inner foot 112 is comprised of an elastomeric joint body that connects the radially outer support to the hub 12. The radially outer portion of the spoke 100 possesses a radially outer foot 114 which is comprised of another elastomeric body which connects the outer support element to yet another surface which is in the present embodiment the radially inner surface of the outer tread band 200.

In the exemplary embodiment shown, the tread band 200 comprises an elastomeric material and allows deformation to form a planar footprint in the contact patch. In the exemplary embodiment shown, the radially outer foot 114 of the spoke 100 is attached to the radially inner surface 202 of the tread band 200 and to the opposite side of the support element from the nose portion 130. In the exemplary embodiment shown, the spoke is adhered in place by a cyanoacrylate adhesive. In other embodiments, the spoke may be attached by other methods, including by adhering the elastomeric material together, for instance by using green rubber and curing the rubber components together, or using a strip of green rubber between cured or partially cured rubber components. In some embodiments, the outer tread band 200 may also possess a reinforcement to help carry the load circumferentially around the tire.

For this particular embodiment, the size of the tire 10 is 205/55R16 with the lateral width of the tread being about 165 mm.

Figure 3:
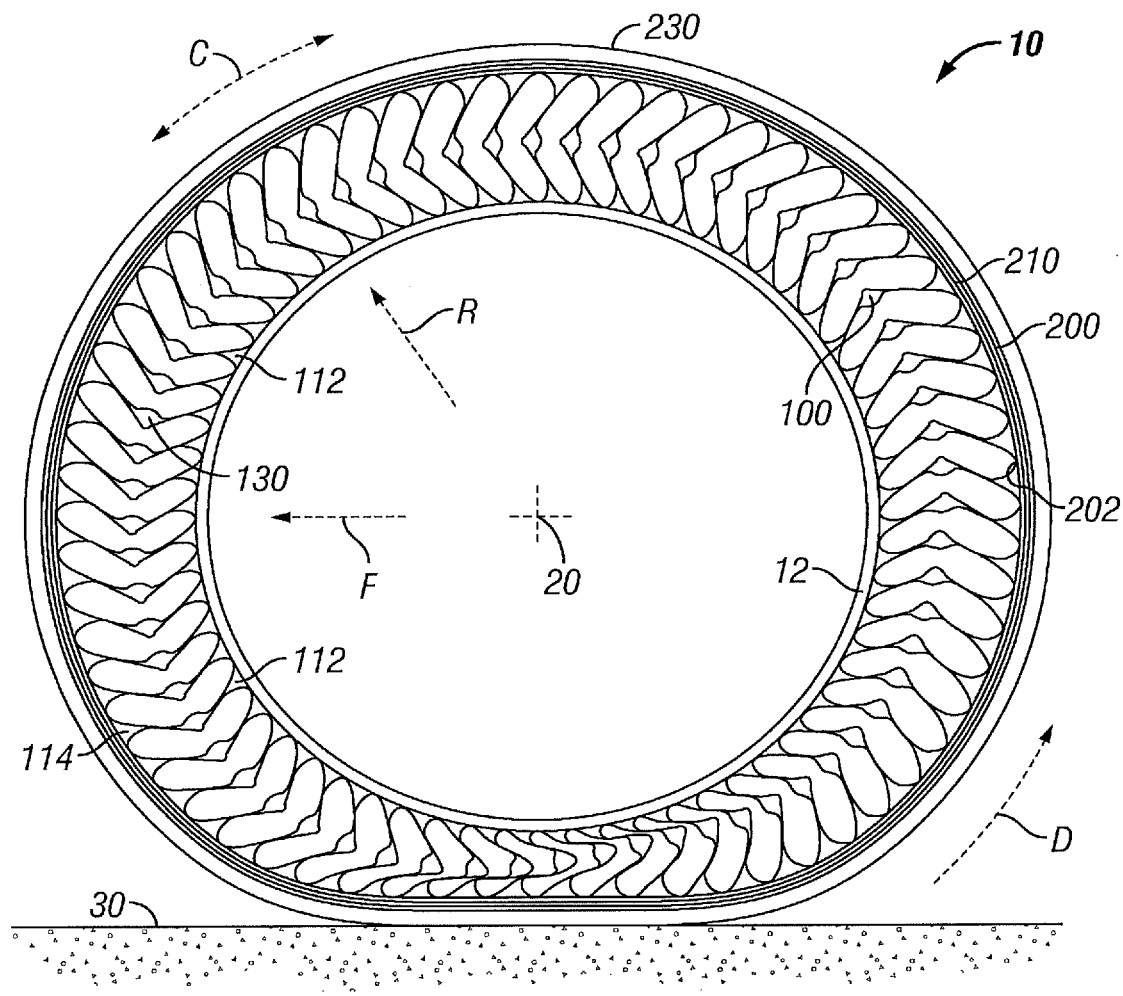
FIG. 3 provides a lateral side view of an exemplary embodiment of the present invention wherein a plurality of resilient composite structures are configured as spokes forming a part of a tire under greater than nominal loading conditions.

FIG. 3 shows the exemplary embodiment of the invention, configured as a spoke in a wheel 10, where the embodiment is loaded in excess of its nominal load. In this particular instance, the tire was loaded with 1000 kg of mass load (approximately 9800 N force). In this case the deflection exceeded 20 mm and resulted in contact between the spoke nose portion 130 and spoke foot portions 110. Under such conditions, the nose and foot portions act as a "bump stop" unloading the leg portions of the spoke. The individual spokes 100 in this situation may make contact with one another as they enter, exit and or travel through the contact patch. The contact is illustrated as occurring between the nose portion 130 and the radially outer foot 114 where the spokes are entering the contact patch and contact is illustrated as occurring between the nose portion 130 and the radially inner foot portion 112 where the spokes are exiting the contact patch. While contact of an individual spoke with the spoke adjacent to it may occur, a portion of the load may be transferred in this case, through the radially inner foot 112, through the nose portion 130 of the spoke 100, through the radially outer foot 114 and through the outer tread band 200 to the ground 30. In a sense, the shape of the spokes of the present embodiment shown may act as a "bump stop" to prevent structural damage to the support elements or legs of the spoke connecting the feet 112, 114 with the nose 130 of the spoke. Such conditions of loading in excess of the nominal load could occur with overloading the vehicle with excess mass, or could occur if the tire encounters an obstacle, such as a curb, while traveling at high speed. While this particular embodiment behaves in this particular manner, other embodiments of the invention may behave differently, and may or may not exhibit "bump stop" qualities.

In the embodiment shown, the outer band 200 possesses reinforcement 210 to strengthen the outer band. A tread 230 is provided on the radially outer surface of the outer band 200.

Spoke Construction.

Figure 4:
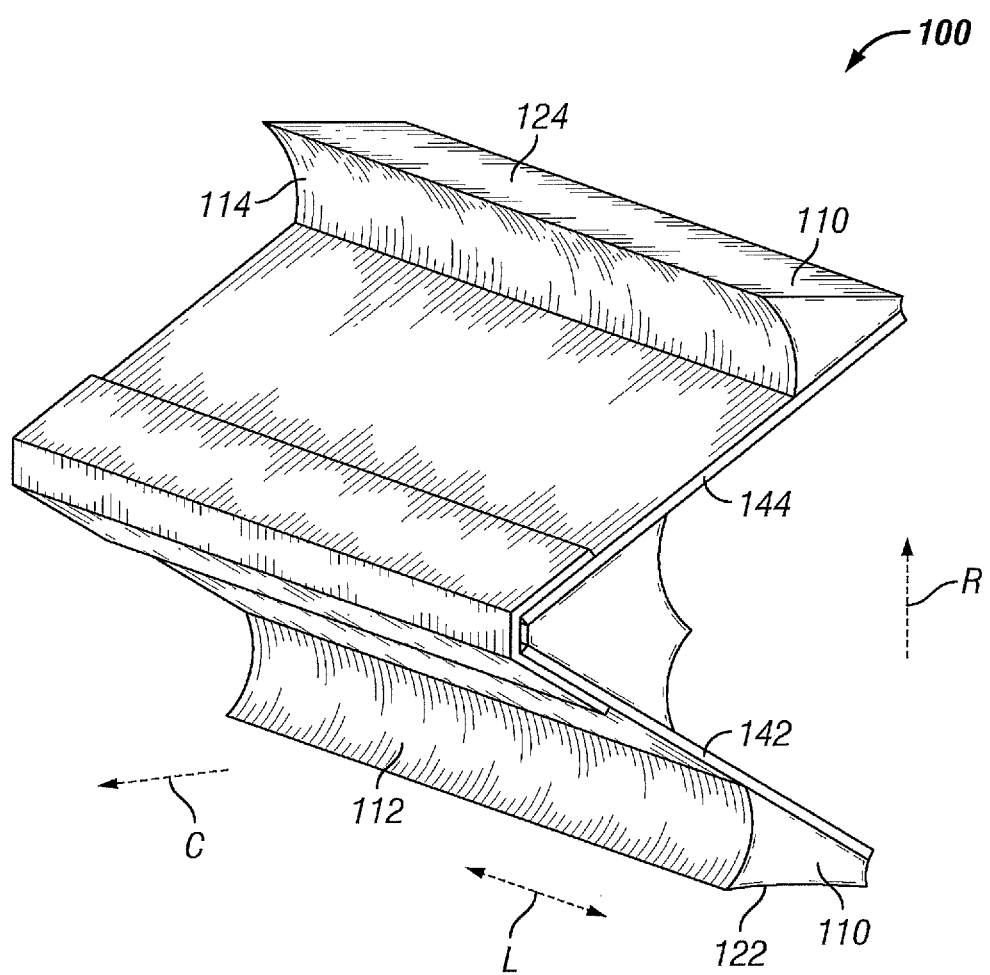
FIG. 4 provides a perspective view of an exemplary embodiment of the present invention configured as a spoke.

FIG. 4 provides a perspective view of the spoke 100 embodiment. In this particular embodiment, the spoke maintains a similar cross section profile in the lateral direction of the spoke. It can be seen that the feet 110, both the radially inner foot 112 and radially outer foot 114, each provide an attachment point to the hub 12 and outer band 200 of the wheel 10. A widening in the circumferential direction at the radially inner end of the radially inner foot 112 provides circumferentially broad surface 122 for attachment, such as adhering, bonding and/or mechanically, to the hub 12. Likewise a widening in the circumferential direction at the radially outer end of the radially outer foot 114 provides circumferentially broad surface 124 for attachment, such as adhering, bonding and/or mechanically, to the outer tread band 200. The radially inner surface 122 and radially outer surface 124 in the embodiment shown are shown to be slightly curved in the circumferential direction of the spoke to match the radius of curvature of the hub and radially inner surface 202 of the outer band 200 at the location where the spoke attaches in the respective positions. Alternatively, the surface of the radially inner surface 122 and radially outer surface 124 may also be flat in the circumferential direction of the spoke.

The nose portion, or otherwise referred to as the "joint body" 130 of the spoke 100 of the embodiment shown is comprised of an elastomeric material and acts to connect a first and second support element, here comprising a radially inner leg 142 and a radially outer leg 144 respectively. The nose portion becomes thicker in the circumferential direction between the radially inner leg 142 and radially outer leg 144. The circumferential direction of the spoke should be understood in this embodiment to be the same as the circumferential direction of the wheel 10. In reference to a single spoke as shown in this embodiment, the circumferential direction is generally orthogonal to both the radial direction and the lateral direction.

It may be observed that the radially inner leg 142 is slightly shorter than the radially outer leg 144 in the embodiment shown. This difference in length accommodates the change in radius as the spoke travels through the contact patch maximizing the space available for the adjacent spokes to "nest."

Figure 5:
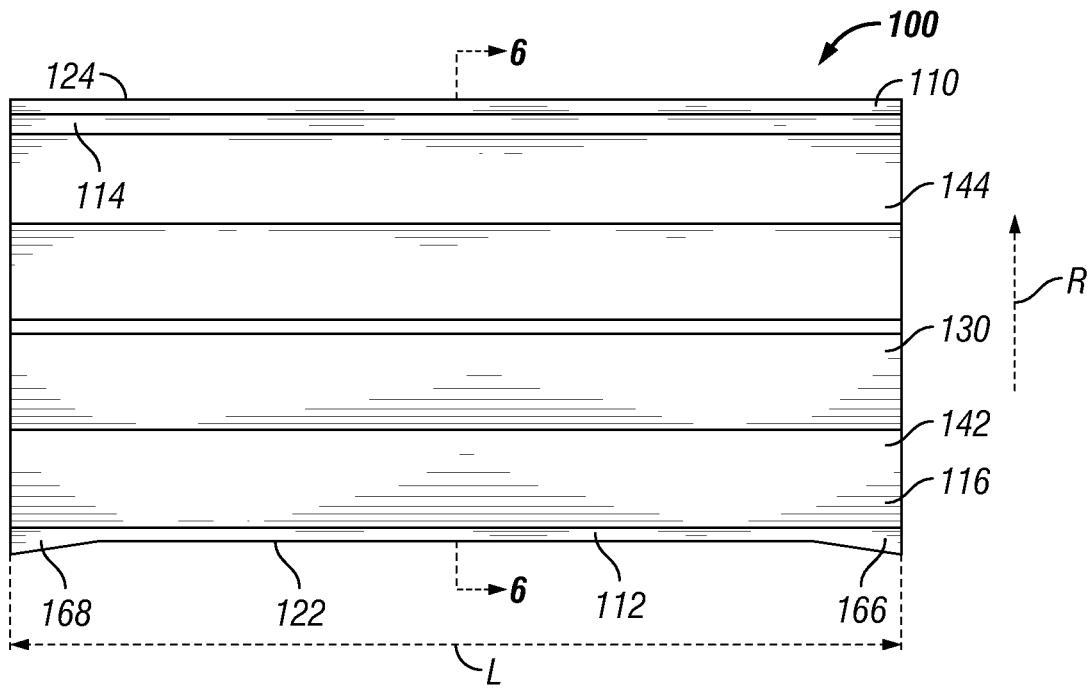
FIG. 5 provides a frontal view of the exemplary embodiment of the spoke.

FIG. 5 shows a front view of the spoke in a circumferential direction. In this embodiment, the radially inner surface possesses a first and second protrusion 166, 168 which creates radially inner surface 122 that is curved in the lateral direction. This causes the cross section of the spoke 100 to vary slightly in the lateral direction. In alternative embodiments the spoke 100 may maintain an identical cross section in the lateral direction.

Figure 6:
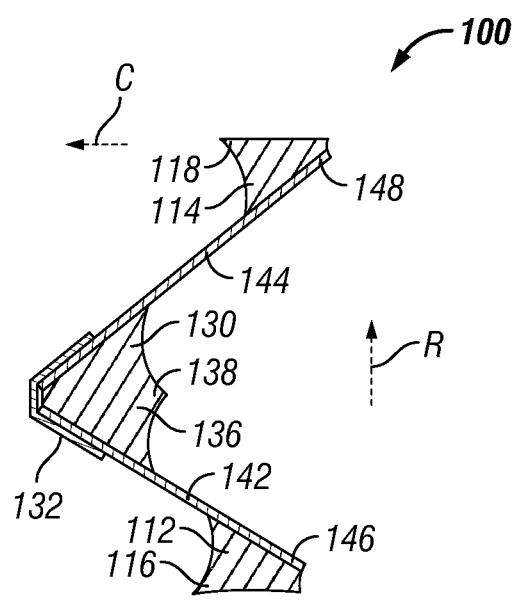
FIG. 6 provides a section view taken on line 5-5 of FIG. 5 showing an equatorial section view of the exemplary embodiment.

FIG. 6 shows a section view of the embodiment showing the main components of the spoke 100. The spoke 100 of the embodiment shown is comprised of rubber of the general type used in the construction of conventional rubber pneumatic radial tires, polyester cord material and fiberglass reinforced resin. Particular embodiments that include more detailed materials information is provided below in the disclosure.

The rubber used in the embodiment shown comprises of a relatively soft rubber having a modulus of 4.8 MPa in the areas of the radially inner elastomeric joint body 112 and radially outer elastomeric joint body 114. Each elastomeric joint body 112, 114 is attached to the radially inner leg 142 and radially outer leg 144 respectively. The radially inner leg 142 and radially outer leg 144 are constructed to give them flexural rigidity, that is, to allow them to resiliently deform when the spoke 100 is under compression or tension. The radially outer end 148 of the radially outer leg 144 is attached to the elastomeric joint body 114, but is otherwise "free" and may move to compress or stretch the elastomeric joint body 114 when the spoke is being stretched or compressed. Likewise the radially inner end 146 of the radially inner leg 142 is attached to the elastomeric joint body 112, but is otherwise "free" and may move to compress or stretch the elastomeric joint body 112 when the spoke 100 is under compression or tension. The radially inner elastomeric joint body 112 becomes thicker in the circumferential direction nearer the hub 12 to which it is attached. In the embodiment shown, the elastomeric joint body 112 flairs outward forming a protrusion 116 nearest the hub 12. Likewise, the radially outer elastomeric joint body 114 becomes thicker in the circumferential direction nearer the outer band 200 to which it is attached. In the embodiment shown, the elastomeric joint body 114 flairs outward forming a protrusion 118 nearest the outer band 200.

In the embodiment shown, a membrane 132 is used to reinforce the nose section 130 of the spoke 100. The membrane structure 132 of the embodiment shown is comprised of polyester fibers made from an 1100 by 2 cord with a pace of approximately 1 mm and a tensile modulus of approximately 3,750 MPa. Such reinforcement fibers are similar to that commonly used in the radial cords of a pneumatic tire. The rubber surrounding the reinforcements of the membrane has a modulus of approximately 5 MPa. For the embodiment shown, this rubber is of a type used in the construction of a conventional pneumatic radial tire. Alternatively, other membrane reinforcement materials may be used, including using cords of other materials, such as aramid, cotton, nylon or rayon or combinations thereof. Alternatively, the reinforcement pace, filament count, cord count and diameter may vary. In the embodiment shown, the reinforcement membrane 132 extends approximately one-fifth of the height of the spokes, generally co-extensive with the generally triangular shaped nose elastomeric joint body 136. In the embodiment shown, the elastomeric joint body 136 thickens and flairs outward in the circumferential direction near the middle section between the radially inner and radially outer spoke legs 142, 144, forming a protrusion 138 at approximately the midpoint of the elastomeric joint body 136.

The reinforcement cords of the reinforcement membranes 132 of the exemplary embodiment are oriented generally in the radial direction along the length of the membranes.

The legs 142, 144 of the spoke 100 are comprised of fiber reinforced plastic reinforcements surrounded by a rubber to form a membrane. In particular embodiments, the leg membranes 142, 144 possess a flexural rigidity, for example, of approximately 140,000 N-mm$^2$. In this particular embodiment, the filaments have a diameter of approximately 1 mm with a pace of about 2 mm apart. The filaments of the particular embodiment shown are glass reinforced resin formed by pultrusion. The filaments of the embodiment have a modulus of approximately 10 MPa. Alternatively other reinforcements may be used, including carbon fiber such as graphite epoxy, glass epoxy or aramid reinforced resins or epoxy or combinations thereof. Unreinforced plastic reinforcements or metallic reinforcements may also be used, provided they have sufficient flexural rigidity for the nominal loads intended to be supported. Alternatively other pacing and other diameters diameter of the membranes and reinforcements may be used. The legs 142, 144 of the spoke 100 have a relatively large stiffness compared to the other components comprising the spoke 100. The legs 142, 144 resist act resiliently and have a large bending stiffness allowing the nose portion 130 of the spoke to act as a joint body connecting the radially inner leg 142 with the radially outer leg 144. The feet 112, 114 act as second and third joint bodies, connecting the radially inner leg 142 to the hub and the radially outer leg 144 with the outer band 200.

Figure 7:
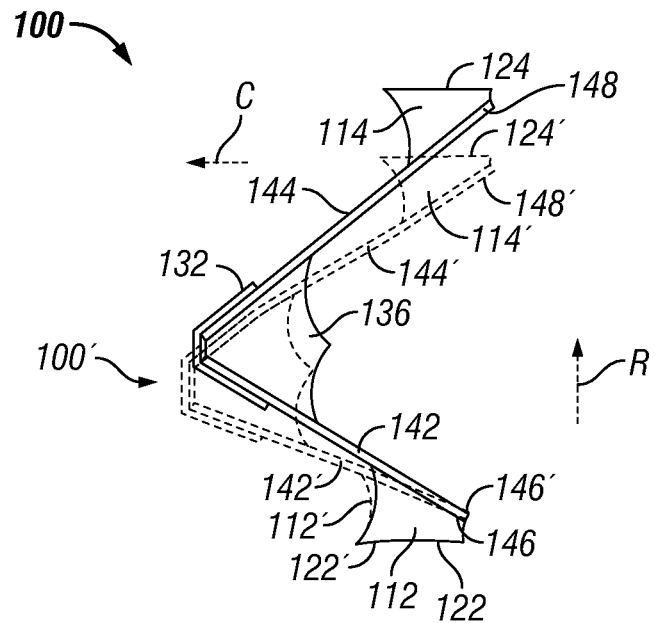
FIG. 7 provides a section view of an embodiment of the present invention forming a part of a tire, the embodiment in an unloaded state (shown in solid lines) and under nominal loading conditions in compression (shown in dashed lines).

FIG. 7 shows a partial lateral section view of the exemplary embodiment of a spoke 100 that can be attached to an outer tread band 200 and hub 12 and forming a part of a tire 10.

When the spoke 100 is deformed radially inward, undergoing compression between the radially outer foot 114 and radially inner foot 112, the elastomeric joint body 136 of the nose 130 undergoes compression between the radially inner leg 142 and radially outer leg 144 of the spoke. The radially outer elastomeric joint body 114 of the radially outer foot 114 undergoes compression along the portion closest to the nose 130 and undergoes tension on the distal portion of the elastomeric joint body 114.

Similarly at the radially inner foot 112, when the spoke 100 is deformed radially inward, the elastomeric joint body 112 of the radially inner foot 112 undergoes compression along the portion closest to the nose 130 and undergoes tension on the distal portion of the elastomeric joint body 112.

The dashed lines in FIG. 7 show the spoke 100' undergoing compression between the radially outer foot 114' and the radially inner foot 112'. The compressed spoke 100' is shown positioned with the hub mating surface 122, 122' fixed in position while the radially outer foot 114, 114' is displaced radially inward. As such, it may be observed that the radially inner portion 146, 146' of the radially inner leg 142, 142' is displaced radially outward when the spoke is compressed such that the radially inner portion 146' of the radially inner leg 142' moves radially outward relative to the radially inner surface 122' of the radially inner foot 112'. Likewise, a similar displacement occurs at the radially outer foot 114, 114' with the radially outer portion 148, 148' of the radially outer leg 144, 144' is displaced radially inward when the spoke is compressed such that the radially outer portion 148' of the radially outer leg 144' moves radially inward relative to the radially outer surface 124' of the radially outer foot 114'. The construction of the spoke permitting displacement of the radially outer portion 148, 148' of the radially outer leg 144, 144' and radially inner portion 146, 146' of the radially inner leg 142, 142' is referred herein as having a "free" spoke end.

The nose portion 130 of the present embodiment possesses a reinforcement membrane 132 which constrains the radially inner portion of the radially outer spoke 144 and radially outer portion of the radially inner spoke 142, restraining them from displacing away from one another when the spoke is under compression. The elastomeric joint body 136 undergoes compression when the spoke 100 is compressed. It may be observed that the portion of the elastomeric joint body 136 farthest from the reinforcement membrane 132 is contracted radially as the spoke 100 is compressed. The construction of the spoke disallowing displacement of the radially inner portion of the radially outer leg 144 and radially outer portion of the radially inner leg 142 may be referred herein as being "constrained" or "not free."

Figure 8:
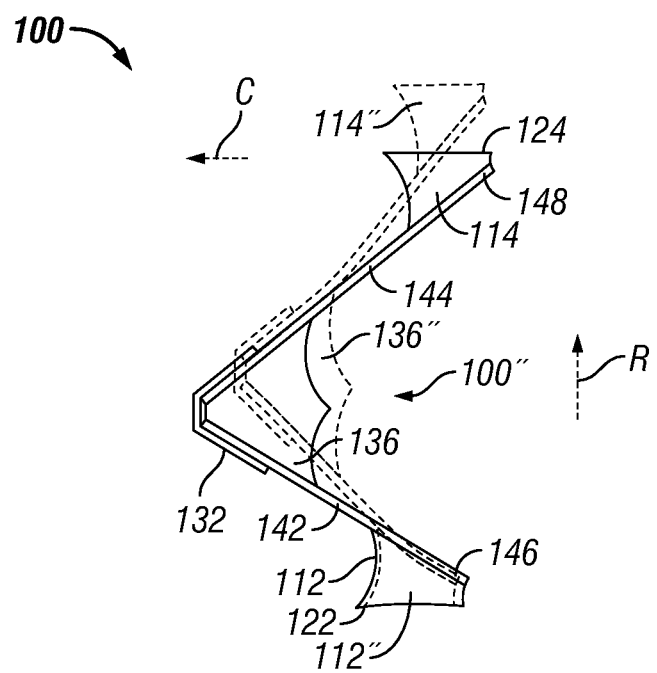
FIG. 8 provides a section view of an embodiment of the present invention forming a part of a tire, the embodiment in an unloaded state (shown in solid lines) and under nominal loading conditions in tension (shown in dashed lines).

FIG. 8 shows the same embodiment when in tension such that the radially outer foot 114, 114" is displaced away from the radially inner foot 112, 112". The spoke 100 shown generally unloaded in solid lines and also the spoke 100' is shown in tension by the dashed lines. Note how the portions of the feet 112, 112", 114, 114" which underwent compression when the spoke was in compression are undergoing tension when the spoke is undergoing tension as shown in the present figure. Likewise the portions of the elastomeric joint bodies of the feet 112, 112", 114, 114" which underwent tension when the spoke was in compression are undergoing compression when the spoke is undergoing tension as shown in the present figure. The elastomeric joint body 136, 136" of the nose portion 130 undergoes tension in the portion closest to the feet 112, 112", 114, 114" of the spoke 100, 100".

Figure 9:
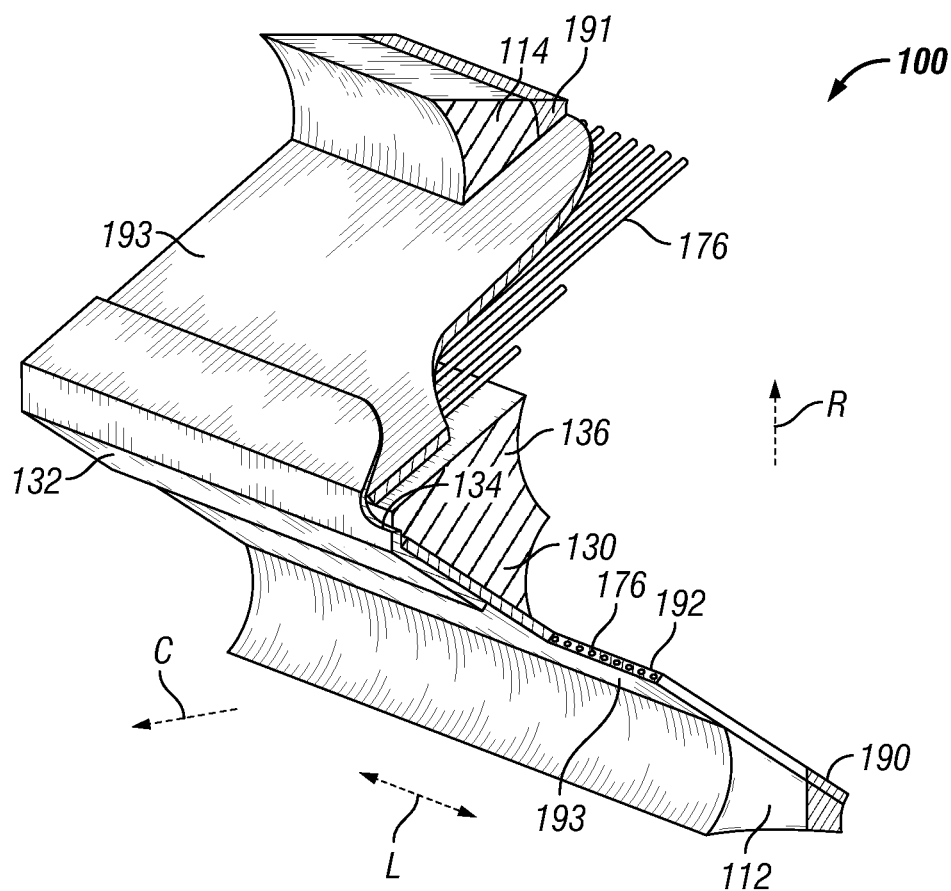
FIG. 9 provides a perspective view of an exemplary embodiment of the spoke of the present invention with portions removed to show an embodiment's components including reinforcement location and orientation having two rubber coatings on the legs and a heel portion.

FIG. 9 shows a perspective cutaway view of the spoke embodiment and further provides an example of a spoke having a heel portion as well as having a spoke leg with two different rubber coatings. Portions of the reinforcement 134 of the nose reinforcement membrane 132 are shown, as well as a portion of the elongated leg reinforcements 176 of the leg 140 and a part of the foot reinforcements of the foot reinforcement membrane are shown as well. The reinforcement of the nose membrane are shown oriented generally in the radial direction and wrapped around the nose 130 of the spoke 100. The support element 140 reinforcements 176 are shown as elongated reinforcements oriented generally in the radial direction along the length of the support elements 140.

FIG. 9 further shows an example of an embodiment that includes a heel portion with two different rubber coatings on the spoke legs. In particular embodiments the durability of the spokes disclosed herein may be improved by adding a heel portion 190, 191 to the proximal ends of the elastomeric joint bodies 112, 114. While the elastomeric joint bodies 112, 114 are typically formed of an ultra-low hysteresis material, the heel portions 190, 191 may be formed of an elastomeric material having a higher rigidity and improved tear characteristics.

As noted, particular embodiments of the spokes disclosed herein may include two different rubber compositions coating the spoke legs. In such embodiments, the elongated leg reinforcements 176 are covered by a first rubber composition layer 193 on the same side of the leg 140 as the elastomeric joint bodies 112, 114 and by a second rubber composition layer 192 on the opposite side of the leg 140. These embodiments may be accomplished by laying down a first thin rubber skim of the first rubber composition layer, putting the elongated leg reinforcements on top of this layer and then adding a second thin rubber skim of the second rubber composition layer on top of that.

Other embodiments of spokes may include using different rubber compositions on the same side of the leg 140. For example, particular embodiments may include coating one or both sides of the leg 140 with a first rubber composition starting from the proximal end of the leg and coating at least 25% of its length, or alternatively at least 50% or at least 75% of its length and then coating the remainder of the length with a second rubber composition. In particular embodiments of the spokes disclosed herein, the side of the leg with the elastomeric joint bodies may be coated with a rubber composition having better tear properties near the for a portion of its length from the proximal end and then a second rubber composition with lower hysteresis properties for the remainder of its length. Those skilled in the art can imagine different arrangements of rubber compositions having differing properties coating different sections of the legs and such embodiments are not excluded by the particular embodiments disclosed above.

Figure 10:
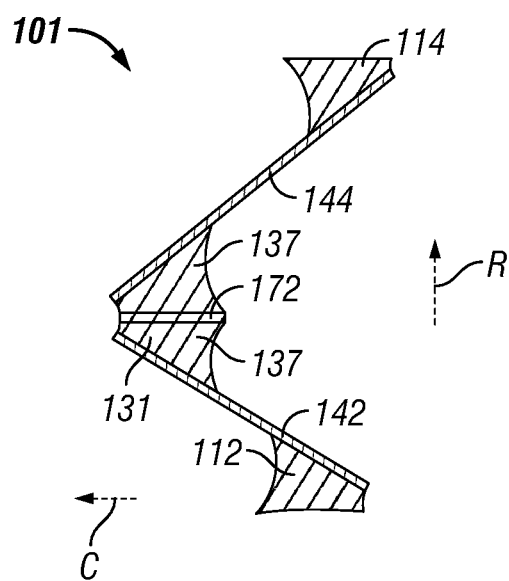
FIG. 10 provides an equatorial section view of an alternative embodiment of the invention.

Alternative embodiments of the invention are also possible and anticipated. For example, FIG. 10 shows a section view of an alternative embodiment wherein the nose reinforcement membrane is not present. Instead, the portion of elastomeric joint body 137 of the nose 131 farthest from the feet 112, 114 is allowed to stretch apart in the radial direction when the spoke is under compression, much like the portion of the elastomeric joint bodies 112, 114 farthest from the nose portion 131 of the spoke 101. Thus in this embodiment, the radially inner end of the radially outer support element 144 and the radially outer end of the radially inner support element 142 are "free." In this particular embodiment, additional reinforcement 172 is placed in the elastomeric joint body 137 of the nose portion 131. This additional reinforcement inhibits movement of the elastomeric joint body in the circumferential direction that otherwise would occur due to the Poisson effect of compression and tension of the elastomeric joint body 137. In this particular embodiment, elongated reinforcements 172 are oriented in the circumferential direction generally bisecting the elastomeric joint body 137 in to two portions; a radially outer portion and a radially inner portion.

Figure 11:
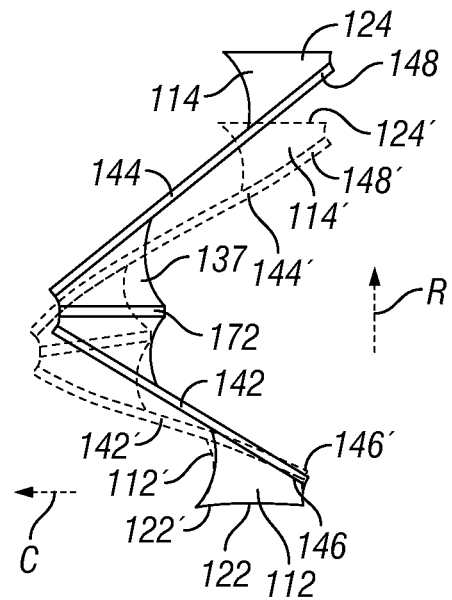
FIG. 11 provides a section view of the alternative embodiment of the present invention forming a part of a tire, the embodiment in an unloaded state (shown in solid lines) and under nominal loading conditions in compression (shown in dashed lines).

FIG. 11 shows a partial lateral section view of the alternative exemplary embodiment of a spoke 101 that can be attached to an outer tread band 200 and hub 12 and form a part of a tire 10.

When the spoke 101 is deformed radially inward, undergoing compression between the radially outer foot 114 and radially inner foot 112, the elastomeric joint body 137 of the nose 131 undergoes compression in the radial direction between the radially inner leg 142 and radially outer leg 144 of the spoke along the portion closest to the feet 112, 114 of the spoke 101 and undergoes tension in the radial direction on the portion of the elastomeric joint body farthest from the feet 112, 114. The radially outer elastomeric joint body 114 of the radially outer foot 114 undergoes compression along the portion closest to the nose 131 and undergoes tension on the portion of the elastomeric joint body 114 most distal from the nose portion 131.

Similarly at the radially inner foot 112, when the spoke 101 is deformed radially inward, the elastomeric joint body 112 of the radially inner foot 112 undergoes compression along the portion closest to the nose 131 and undergoes tension on the distal portion of the elastomeric joint body 112.

The dashed lines in FIG. 11 show the spoke undergoing compression between the radially outer foot 114' and the radially inner foot 112'. The compressed spoke is shown positioned with the hub mating surface 122, 122' fixed in position while the radially outer foot 114, 114' is displaced radially inward. As such, it may be observed that the radially inner portion 146, 146' of the radially inner leg 142, 142' is displaced radially outward when the spoke is compressed such that the radially inner portion 146' of the radially inner leg 142' moves radially outward relative to the radially inner surface 122' of the radially inner foot 112'. Likewise, a similar displacement occurs at the radially outer foot 114, 114' with the radially outer portion 148, 148' of the radially outer leg 144, 144' is displaced radially inward when the spoke is compressed such that the radially outer portion 148' of the radially outer leg 144' moves radially inward relative to the radially outer surface 124' of the radially outer foot 114'. The construction of the spoke permitting displacement of the radially outer portion 148, 148' of the radially outer leg 144, 144' and radially inner portion 146, 146' of the radially inner leg 142, 142' is referred herein as having a "free" spoke end. As shown in this alternative embodiment, the radially inner portion of the radially outer support structure 144 and the radially outer portion of the radially inner support structure 142 may be referred herein as having "free" spoke ends.

The nose portion 131 of the present embodiment possesses a reinforcement 172 which constrains the elastomeric body 137 in the circumferential direction. The elastomeric joint body 137 undergoes compression along the portion closest to the feet 112, 114 when the spoke 101 is compressed. The Poisson effect causes bulging of the elastomeric material when it is under compression, which is restrained here by the reinforcement 172.

Figure 12:
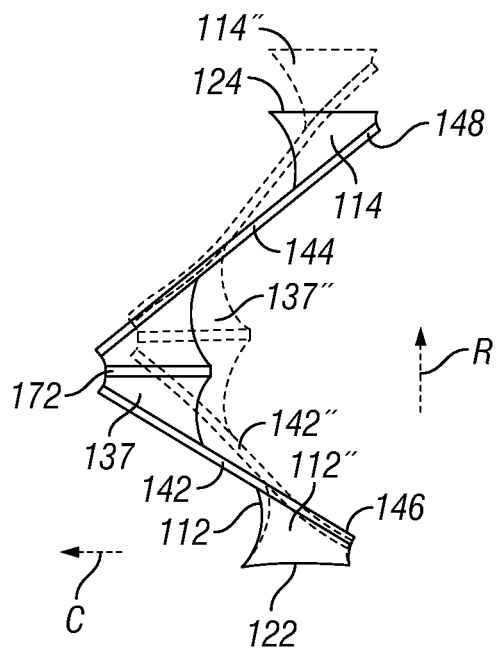
FIG. 12 shows a section view of the alternative embodiment of the present invention forming a part of a tire, the embodiment in an unloaded state (shown in solid lines) and under nominal loading conditions in tension (shown in dashed lines).

FIG. 12 shows the same embodiment when in tension such that the radially outer foot 114, 114" is displaced away from the radially inner foot 112, 112". The spoke 101 shown generally unloaded in solid lines and also the spoke is shown in tension by the dashed lines. Note how the portions of the feet 112, 112", 114, 114" which underwent compression when the spoke was in compression are undergoing tension when the spoke is undergoing tension as shown in the present figure. Likewise the portions of the elastomeric joint bodies of the feet 112, 112", 114, 114" which underwent tension when the spoke was in compression are undergoing compression when the spoke is undergoing tension as shown in the present figure. The elastomeric joint body 137, 137" of the nose portion 131 undergoes tension in the portion closest to the feet 112, 112", 114, 114" of the spoke 101 and the portions of the elastomeric joint body 137, 137" of the nose portion 131 undergoes compression in the portion farthest from the feet 112, 112", 114, 114" of the spoke 101.

Figure 13:
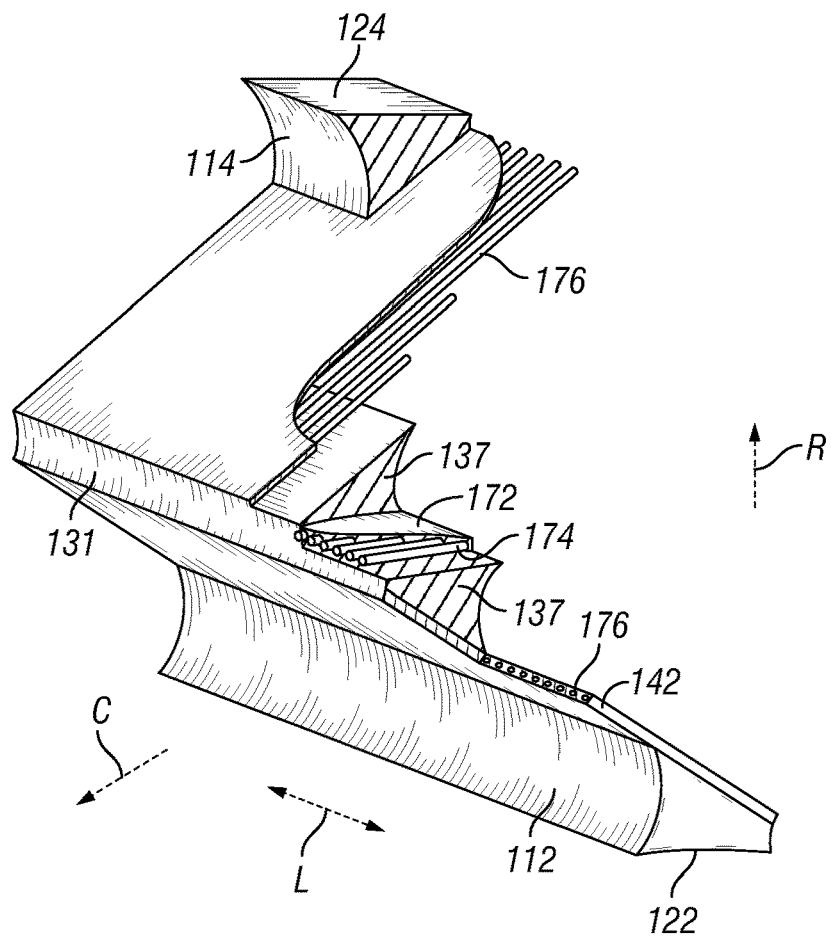
FIG. 13 shows a perspective view of the alternative exemplary embodiment of the spoke of the present invention with portions removed to show the embodiment's components including reinforcement location and orientation.

FIG. 13 shows a perspective cutaway view of the spoke embodiment. Portions of the elongated leg reinforcements 176 of the legs 140 are shown. The reinforcement 172 of the elastomeric joint body 137 is shown as a plurality of reinforcements 174 oriented in the circumferential direction. The support element 140 reinforcements 176 are shown as elongated reinforcements oriented generally in the radial direction along the length of the support elements 140. The reinforcements 176, 174 of the present embodiment are pultruded glass resin composite.

Figure 14:
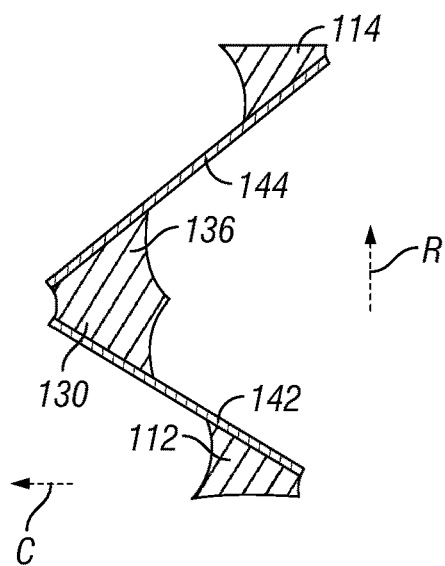
FIG. 14 shows an equatorial section view of another exemplary alternative embodiment of the invention.

FIG. 14 shows a section view of an alternative embodiment wherein neither the nose reinforcement membrane, nor the elastomeric joint body reinforcement is present. Here, like the previous embodiment, the portion of elastomeric joint body 136 of the nose 130 farthest from the feet 112, 114 is allowed to stretch apart in the radial direction when the spoke is under compression, much like the portion of the elastomeric joint bodies 112, 114 farthest from the nose portion 130 of the spoke 100. Thus in this embodiment, the radially inner end of the radially outer support element 144 and the radially outer end of the radially inner support element 142 are "free." In this particular embodiment the elastomeric joint body 136 of the nose portion 130 is free of any elongated reinforcements.

Figure 15:
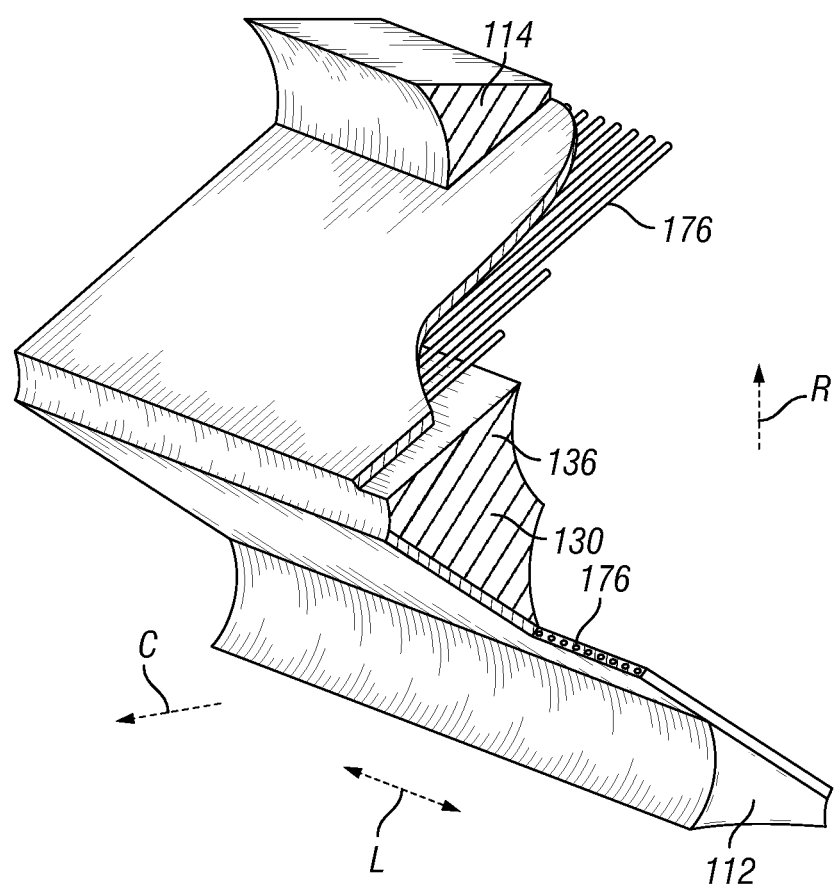
FIG. 15 shows a perspective view of the alternative exemplary embodiment of the spoke of the present invention with portions removed to show the embodiment's components including reinforcement location and orientation.

FIG. 15 shows a perspective cutaway view of the spoke embodiment. Portions of the elongated leg reinforcements 176 of the leg 140 are shown. The support element 140 reinforcements 176 are shown as elongated reinforcements oriented generally in the radial direction along the length of the support elements 140. The reinforcements 176 of the present embodiment are pultruded glass resin composite.

Spoke Elastomeric Materials.

As noted above, embodiments of the spokes that are disclosed herein include a rubber coating on the spoke legs and elastomeric joint bodies that connect the proximal ends of the spoke to the hub (the hub joint body) and band (the band joint body) respectively and an elastomeric joint body at the nose section (nose joint body) of the spoke that connects the distal ends of the spoke legs. In particular embodiments, the hub and band joint bodies may include a heel portion located at their proximal ends. To maintain a lower hysteresis in the hub and band joint bodies, particular embodiments that include a heel portion in the joint bodies may provide that no more than 30 vol % of the joint body be the heel portion or alternatively, no more than 25 vol % or no more than 20 vol %. As a lower boundary of the heel volume, particular embodiments that include a heel portion may include at least 5 vol % or at least 10 vol % as the heel portion of the joint body. The percent volume is of the total volume of the joint body, i.e., total volume being the heel and the non-heel portions of the joint body.

In particular embodiments, the heel portion is found to provide improved durability of the proximal ends of the spoke assembly. In such embodiments, the heel portion is of a different rubber composition than the remainder of the elastomeric joint body. The heel, if present, may form a portion of the hub joint body, the band joint body or both.

The rubber compositions useful for the spokes disclosed herein differ based upon their service. For the rubber coating of the legs, particular embodiments include a rubber composition that may be characterized as having a higher rigidity than the hub, band and nose joint bodies and also having ultra-low hysteresis properties to provide the non-pneumatic tire with low rolling resistance. The higher rigidity is found to be useful in some embodiments because it provides improved lateral stiffness for the non-pneumatic tire. Particular embodiments of the rubber compositions suitable for the rubber coating of the spoke legs therefore possess at least one or more of the following set of physical properties: a modulus of elongation at 10% elongation (MA10) as measured in accordance with ASTM D412 of between 2.0 MPa and 5.0 MPa or alternatively between 3.0 MPa and 4.0 MPa; an ultra-low hysteresis as determined by the tan delta measured at 23° C. and at 50% strain of between 0.015 and 0.035 or alternatively between 0.019 and 0.029; and a complex shear modulus G* measured at 23° C. and at 50% strain of at least 1.25 MPa or alternatively between 1.25 MPa and 1.45 MPa or between 1.3 MPa and 1.4 MPa.

The joint bodies also have an effect on the rolling resistance of the tire so for particular embodiments it is suitable to use rubber compositions that have ultra-low hysteresis but it is also important that they possess good tear resistance. Particular embodiments of the rubber compositions suitable for the joint bodies therefore possess at least one or more of the following set of physical properties: a modulus of elongation at 10% elongation (MA10) as measured in accordance with ASTM D412 of between 2.0 MPa and 5.0 MPa or alternatively between 3.0 MPa and 4.0 MPa; an ultra-low hysteresis as determined by the tan delta measured at 23° C. and at 50% strain of between 0.015 and 0.035 or alternatively between 0.019 and 0.029; a complex shear modulus G* measured at 23° C. and at 50% strain of at least 1.25 MPa or alternatively between 1.25 MPa and 1.45 MPa or between 1.3 MPa and 1.4 MPa; and a tear resistance property of measured on a notched test piece at 23° C. of a stress at break of between 15 MPa and 30 MPa or alternatively between 20 MPa and 25 MPa and a strain at break of between 85% and 120% or alternatively between 95% and 110%.

For those embodiments that include joint bodies having a heel, the heel portion is typically formed from a rubber composition that may be characterized as having better tear properties and is much more rigid. Particular embodiments of the rubber compositions suitable for the heel portion therefore possess at least one or more of the following set of physical properties: a modulus of elongation at 10% elongation (MA10) as measured in accordance with ASTM D412 of between 4.0 MPa and 15.0 MPa or alternatively between 5.0 MPa and 12.0 MPa or 8 MPa and 12 MPa; a complex shear modulus G* measured at 23° C. and at 50% strain of between 1.8 MPa and 3.0 MPa or alternatively between 2.0 MPa and 2.8 MPa; and a tear resistance property of measured on a notched test piece at 23° C. of a stress at break of between 55 MPa and 75 MPa or alternatively between 55 MPa and 68 MPa and a strain at break of between 100% and 250% or alternatively between 100% and 200%.

Each of the rubber compositions useful in the spoke embodiments disclosed herein include one or more highly unsaturated diene rubbers, which are diene elastomers that are resulting at least in part from conjugated diene monomers and having a content of such monomers that is greater than 50 mol %. Natural rubber is a highly unsaturated diene elastomer.

Suitable highly unsaturated diene rubbers may include, for example, polybutadienes (BR), polyisoprenes (IR), natural rubber (NR), butadiene copolymers, isoprene copolymers and mixtures of these elastomers. Such copolymers include butadiene/styrene copolymers (SBR), isoprene/butadiene copolymers (BIR), isoprene/styrene copolymers (SIR) and isoprene/butadiene/styrene copolymers (SBIR). Suitable elastomers may also include any of these elastomers being functionalized elastomers, such functionalized elastomers being well-known in the art.

For those rubber compositions that are useful as ultra-low hysteresis rubber compositions, namely those for use in the nose joint body, the hub joint body and the band joint body, and for those that are useful for the coating on the spoke legs, particularly useful rubber components include, for example, natural rubber (NR), polybutadiene rubber (BR) and copolymers of polybutadiene rubber and styrene (SBR).

For particular embodiments of the joint body rubber compositions, the SBR copolymers are limited to having no more than 5 mol % bound styrene since higher amounts may provide undesired increases in the hysteresis of the rubber composition. However, when the SBR is functionalized with a moiety that can interact with a silica reinforcing filler, then the bound styrene content may be higher such as, for example, between 1 mol % and 35 mol % or alternatively between 1 mol % and 30 mol % or between 1 mol % and 20 mol % bound styrene content. In particular embodiments, higher bound styrene content, i.e., above 30 mol %, is not useful. Functionalized rubbers, i.e., those appended with active moieties, are well known in the industry and such rubbers may be functionalized by attaching these active moieties to the polymer backbone, along the branches of the polymer or at the branch ends of the polymer. Suitable functionalizing moieties that interact with a silica filling include, for example, silanol groups, polysiloxane groups, alkoxysilane groups and amino groups.

Particular embodiments of the joint body rubber compositions disclosed herein may include between 50 phr and 100 phr of natural rubber or alternatively between 60 phr and 100 phr, between 75 phr and 100 phr or between 85 phr and 100 phr of natural rubber. Particular embodiments may be limited to 100 phr of natural rubber. Use of less than these amounts of natural rubber may result in not achieving the target tear properties of the cured rubber composition.

In addition to the natural rubber, such rubber compositions may include between 0 phr and 50 phr of a second rubber component or alternatively between 0 phr to 40 phr, between 0 phr and 25 phr or between 0 phr and 15 phr of the second rubber component. The second rubber component may be selected from the group of polybutadiene rubber or a styrene-butadiene copolymer with a bound styrene content of no more than 5 mol % or alternatively no more than 3 mol % or combinations of the rubber components. Particular embodiments may be limited to 0 phr of the second rubber component or alternatively to 0 phr of the SBR copolymer. The inclusion of only these rubber components can help ensure that the ultra-low hysteresis targets may be reached for the disclosed rubber compositions. Particular embodiments of the rubber compositions for the joint bodies include no other rubber components other than the functionalized SBR as disclosed below.

As has been noted above, when the SBR is functionalized with a moiety that interacts with a silica reinforcing filler, the embodiments of the rubber compositions disclosed herein that are reinforced at least in part with a silica filler may further include between 0 phr and 20 phr of the functionalized SBR component or alternatively between 0 phr and 15 phr or between 0 phr and 10 phr of the functionalized SBR. In particular embodiments, the amount of such functionalized SBR is limited to 0 phr.

Particular embodiments of the rubber compositions useful for the coating on the spoke legs disclosed herein may include between 50 phr and 100 phr of natural rubber or alternatively between 50 phr and 95 phr, between 50 phr and 90 phr or between 60 phr and 80 phr of natural rubber. Particular embodiments may be limited to 100 phr of natural rubber.

In addition to the natural rubber, such rubber compositions may include between 0 phr and 50 phr of a second rubber component selected from the group polybutadiene rubber or a styrene-butadiene copolymer with a bound styrene content of no more than 5 mol % or alternatively no more than 3 mol %. Alternatively the amount of such second rubber component may be between 5 phr and 50 phr, between 10 phr and 50 phr or between 20 phr and 40 phr. Particular embodiments of the rubber compositions for the rubber coating of the spoke legs include no other rubber components other than the functionalized SBR as disclosed above and in the same limited quantities as were disclosed as being useful for the joint body rubber compositions.

Particular embodiments of the rubber compositions useful for the heel portion of the joint bodies disclosed herein may include between 90 phr and 100 phr of natural rubber or alternatively between 95 phr and 100 phr of natural rubber. Particular embodiments may be limited to 100 phr of natural rubber. The high amounts of natural rubber help ensure that the tear property target is achieved and provide particular embodiments of the non-pneumatic tire with increased robustness.

In addition to the natural rubber, such rubber compositions may include between 0 phr and 10 phr of a second highly unsaturated diene elastomer or alternatively between 0 phr and 5 phr. Such useful rubber components include, for example, any of those highly unsaturated diene elastomers disclosed above.

In addition to the rubber components disclosed above, each of the rubber compositions further include a reinforcing filler. Reinforcing fillers are added to rubber compositions typically to improve, inter alia, their tensile strength and their rigidity. Reinforcing fillers that are very well known in the industry include, for example, carbon black and silica.

For those rubber compositions that are useful as ultra-low hysteresis rubber compositions, namely those for use in the nose joint body, the hub joint body and the band joint body, particular embodiments are reinforced with a silica filler with only a small amount of carbon black included if desired to color the rubber composition black.

Silica may take many useful forms including, for example, as powder, microbeads, granules, balls and/or any other suitable form as well as mixtures thereof. Such silicas may be fumed, precipitated and/or highly dispersible silica (known as "HD" silica).

Useful silicas are those that have a surface area of between 25 $m^2/g$ and 39 $m^2/g$ or alternatively, between 29 $m^2/g$ and 39 $m^2/g$ or between 30 $m^2/g$ and 35 $m^2/g$. Examples of useful silicas may include, for example Silene 732D (powder form, surface area 35 $m^2/g$) available from PPG and Ultrasil 880 (powder form, 35 $m^2/g$), which is available from Evonik. The surface area for silica fillers is determined in accordance with ASTM D1993. These useful silicas are typically in powder form.

To obtain the desired physical properties of the rubber compositions for the joint bodies, the loadings of the reinforcing fillers are low. If the loadings become too high, then the ultra-low hysteresis targets cannot be achieved and if the loadings are too low, then the targets for increased rigidity and improved tear properties are not met.

Therefore particular embodiments of the rubber compositions useful for the joint bodies may include between 15 phr and 40 phr of silica or alternatively between 20 phr and 40 phr or between 25 phr and 35 phr of silica. If carbon black is added to the rubber compositions, then the amount of carbon black is limited to between 0 phr and 6 phr or alternatively to between 1 phr and 6 phr or between 1 phr and 5 phr of carbon black. Particular embodiments may limit the carbon black to one or more of those having a surface area of between 19 $m^2/g$ and 39 $m^2/g$ or alternatively between 25 $m^2/g$ and 39 $m^2/g$ or between 32 $m^2/g$ and 39 $m^2/g$ as measured in accordance with ASTM D6556.

In accordance with ASTM D1765 Standard Classification of Carbon Blacks, those carbon blacks having a surface area of between 25 $m^2/g$ and 32 $m^2/g$ are classified as Group No. 7 and those carbon blacks having a surface area of between 33 $m^2/g$ to 39 $m^2/g$ are classified as Group No. 6. Examples of such Group No. 6 carbon blacks include N630, N650, N660, N683 and examples of such Group No. 7 carbon blacks include N754, N762, N765, N772 and N787. An example of a carbon black having a surface area of 19 $m^2/g$ that is available on the market is S204, available from Orion Engineered Carbon with offices in Kingwood, Tex. This carbon black has a nitrogen surface area of 19 m²/g, an OAN (ASTM D2414) of 138 ml/100 g, a COAN (ASTM D3493-09) of 76 ml/100 g and an iodine number (ASTM D1510) of 19.6 mg/g.

For those rubber compositions that are useful for the rubber coating of the spoke legs, particular embodiments are reinforced with a mixture of carbon black and silica. Useful carbon blacks and silicas include those disclosed above. For those carbon blacks having a surface area of less than 25 m²/g, particular embodiments limit such carbon blacks to those further having a OAN as determined by ASTM D2414 of between 100 ml/100 g and 150 ml/100 g or alternatively, between 110 ml/100 g and 150 ml/100 g. The oil adsorption number (OAN) is a measure of the carbon blacks structure, a higher structure carbon black being those with aggregates that are joined into more chain-like clusters, having a narrow core with more branching.

More particularly, to provide the desired rigidity and tear resistance of the spoke legs and still maintain a lower hysteresis, particular embodiments of the rubber compositions disclosed herein useful for the spoke leg coatings may include between 25 phr and 40 phr of total filler or alternatively between 30 phr and 35 phr of total filler. Such rubber compositions are limited to having a carbon black to silica ratio, by wt % of total filler, of between 60/40 and 30/70 wt % of carbon black to silica or alternatively between 55/45 and 45/55 wt % of carbon black to wt % silica. An example of determining this ratio is included in Example 1.

It should be noted that since the rigidity and cohesiveness of the rubber compositions disclosed herein are relatively low, particular embodiments of the rubber compositions useful for the joint bodies and/or the rubber coatings on the legs may include no plasticizers, including oils and/or resins. Particular embodiments of the heel portion of the joint bodies may include a plasticizer such as an oil and/or a plasticizing resin.

For those rubber compositions that are useful for the heel portion of the hub joint body and the band joint body, particular embodiments of such rubber compositions include carbon black, silica or combinations thereof. In particular embodiments, the total amount of filler may be between 40 phr and 60 phr or alternatively between 45 phr and 55 phr of filler. Particularly useful carbon blacks are those having a surface area (ASTM D6556) of between 70 m²/g and 120 m²/g or alternatively between 70 m²/g and 100 m²/g. Useful silicas include, for example, Zeosil 125 GR having a CTAB of 115 m²/g and a BET of 125 m²/g; Zeosil 1115 MP having a CTAB of 110 m²/g and a BET of 115 m²/g; and Zeosil 1165 MP having a CTAB of 155 m²/g and a BET of 160 m²/g. These silica examples are all available from Rhodia.

In accordance with ASTM D1765 Standard Classification of Carbon Blacks, those carbon blacks having a surface area of between 70 m²/g and 99 m²/g are classified as Group No. 3 and those carbon blacks having a surface area of between 100 m²/g to 120 m²/g are classified as Group No. 2. Examples of such Group No. 3 carbon blacks include N326, N347, N335 and examples of such Group No. 2 carbon blacks include N220, N224, and N231.

For those embodiments that include silica as a reinforcing filler, a silica coupling agent may be included. Such coupling agents are well known and are at least bifunctional to provide a sufficient chemical and/or physical connection between the inorganic reinforcing filler and the diene elastomer. Examples of such coupling agents include bifunctional organosilanes or polyorganosiloxanes. Particular well known examples of coupling agents include 3,3'-bis(triethoxysilylpropyl)disulfide (TESPD) and 3,3'-bis(triethoxysilylpropyl)tetrasulfide (TESPT).

In addition to the rubber components and the reinforcing fillers discussed above, the rubber compositions disclosed herein may further include a curing system. Particular embodiments are cured with a sulfur curing system that includes free sulfur and may further include, for example, one or more of accelerators, stearic acid and zinc oxide. Suitable free sulfur includes, for example, pulverized sulfur, rubber maker's sulfur, commercial sulfur, and insoluble sulfur. The amount of free sulfur included in the rubber composition is not limited and may range, for example, between 0.5 phr and 10 phr or alternatively between 0.5 phr and 5 phr or between 0.5 phr and 3 phr. Particular embodiments may include no free sulfur added in the curing system but instead include sulfur donors.

Accelerators are used to control the time and/or temperature required for vulcanization and to improve the properties of the cured rubber composition. Particular embodiments of the present invention include one or more accelerators. One example of a suitable primary accelerator useful in the present invention is a sulfenamide. Examples of suitable sulfenamide accelerators include n-cyclohexyl-2-benzothiazole sulfenamide (CBS), N-tert-butyl-2-benzothiazole Sulfenamide (TBBS), N-Oxydiethyl-2-benzthiazolsulfenamid (MBS) and N'-dicyclohexyl-2-benzothiazolesulfenamide (DCBS). Combinations of accelerators are often useful to improve the properties of the cured rubber composition and the particular embodiments include the addition of secondary accelerators.

Other additives can be added to the rubber compositions disclosed herein as known in the art. Such additives may include, for example, some or all of the following: antidegradants, antioxidants, fatty acids, waxes, stearic acid and zinc oxide. Examples of antidegradants and antioxidants include 6PPD, 77PD, IPPD and TMQ and may be added to rubber compositions in an amount, for example, of from 0.5 phr and 5 phr. Zinc oxide may be added in an amount, for example, of between 1 phr and 6 phr or alternatively, of between 1.5 phr and 4 phr. Waxes may be added in an amount, for example, of between 1 phr and 5 phr.

The rubber compositions that are embodiments of the present invention may be produced in suitable mixers, in a manner known to those having ordinary skill in the art, typically using two successive preparation phases, a first phase of thermo-mechanical working at high temperature, followed by a second phase of mechanical working at lower temperature.

The first phase of thermo-mechanical working (sometimes referred to as "non-productive" phase) is intended to mix thoroughly, by kneading, the various ingredients of the composition, with the exception of the vulcanization system. It is carried out in a suitable kneading device, such as an internal mixer or an extruder, until, under the action of the mechanical working and the high shearing imposed on the mixture, a maximum temperature generally between 120° C. and 190° C., more narrowly between 130° C. and 170° C., is reached.

After cooling of the mixture, a second phase of mechanical working is implemented at a lower temperature. Sometimes referred to as "productive" phase, this finishing phase consists of incorporating by mixing the vulcanization (or cross-linking) system (sulfur or other vulcanizing agent and accelerator(s)), in a suitable device, for example an open mill. It is performed for an appropriate time (typically between 1 and 30 minutes, for example between 2 and 10 minutes) and at a sufficiently low temperature lower than the vulcanization temperature of the mixture, so as to protect against premature vulcanization.

It should be noted that the rubber compositions described herein for the different uses, e.g., elastomeric joint bodies, heels and rubber coatings, are described as having ranges of components used in the rubber compositions and ranges in the desired properties of the cured rubber compositions. As those skilled in the art will recognize, the rubber compositions for each use may be the same or different. For example, each of the nose joint bodies may be formed from exactly the same rubber composition or from different ones so long as they are all formed from the ranges of materials as described and or claimed herein. Likewise as a further example, each of the rubber coatings may be formed from exactly the same rubber compositions or from different ones so long as they are all formed from the ranges of materials as described and or claimed herein.

Figure 16:
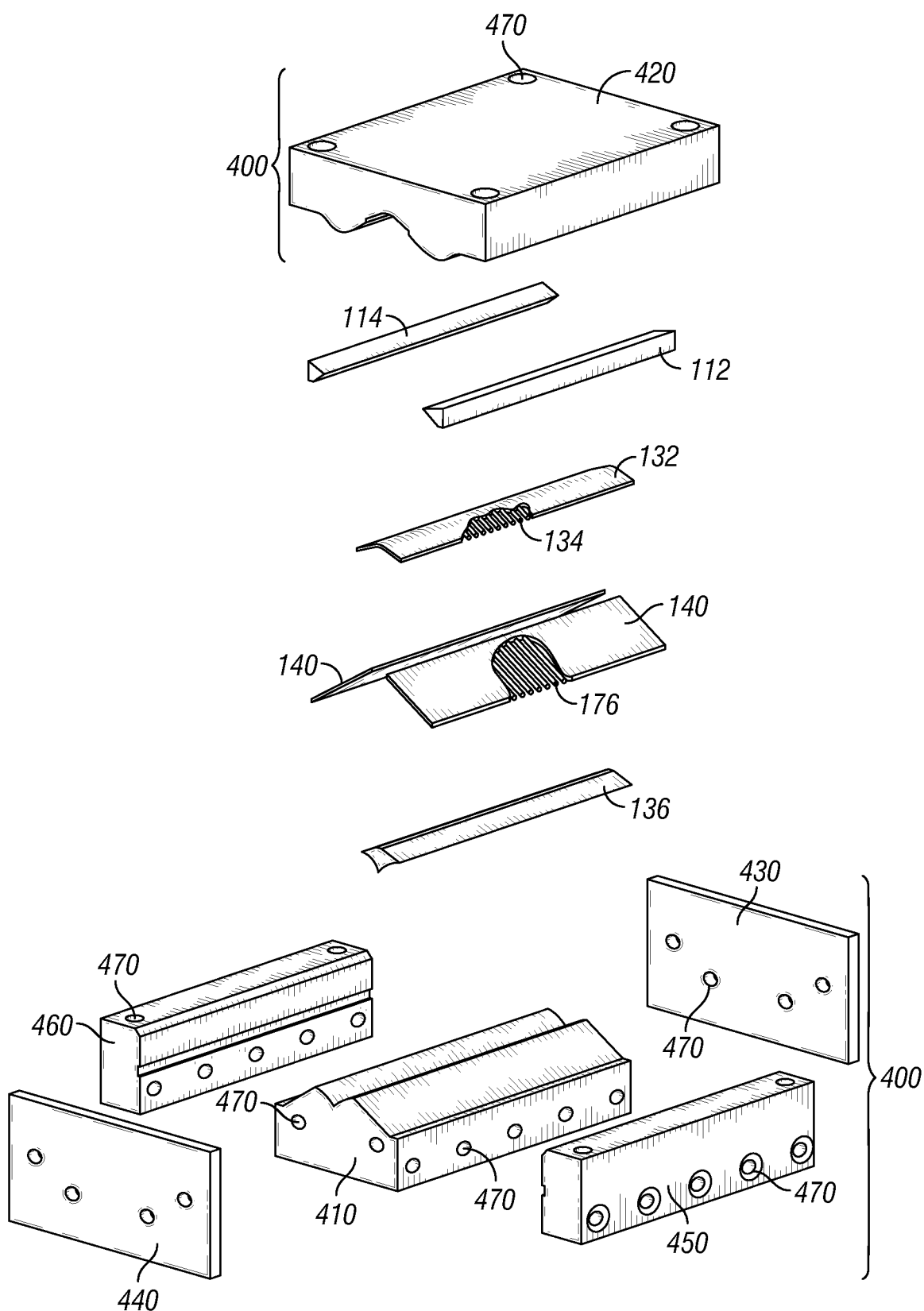
FIG. 16 provides a perspective view of an exemplary embodiment of a mold used for forming a spoke embodiment of the invention. The resilient composite structure's components are shown, with some components having a portion of the elastic material removed to show reinforcement location and orientation.

Molds for Spokes. FIG. 16 shows an exploded perspective view of a particular embodiment of a mold 400, 410, 420, 430, 440, 450, 460 used to manufacture one example of an individual spoke 100. The spoke components are shown separated as they are placed into the mold. Some of the spoke components show the orientation of the reinforcement fibers and cords. For example, the nose reinforcement membrane 132 reinforcements 134 are shown in the partial cutaway view of that component. The reinforcements are shown in this embodiment to run parallel to one another and along the width of the reinforcement membrane 132. Both of the legs 140, 142, 144 are shown and the radially inner leg 142 is shown with a partial cut-away showing the composite glass resin reinforcements 176 positioned parallel to one another and along the width of the radially inner leg 140. While the reinforcements 176 of the legs 140 are resiliently flexible, the fiber reinforcement 134 of the nose reinforcement membrane 132 are flexible enough to be permanently deformed upon molding of the surrounding rubber matrix material.

Figure 17:
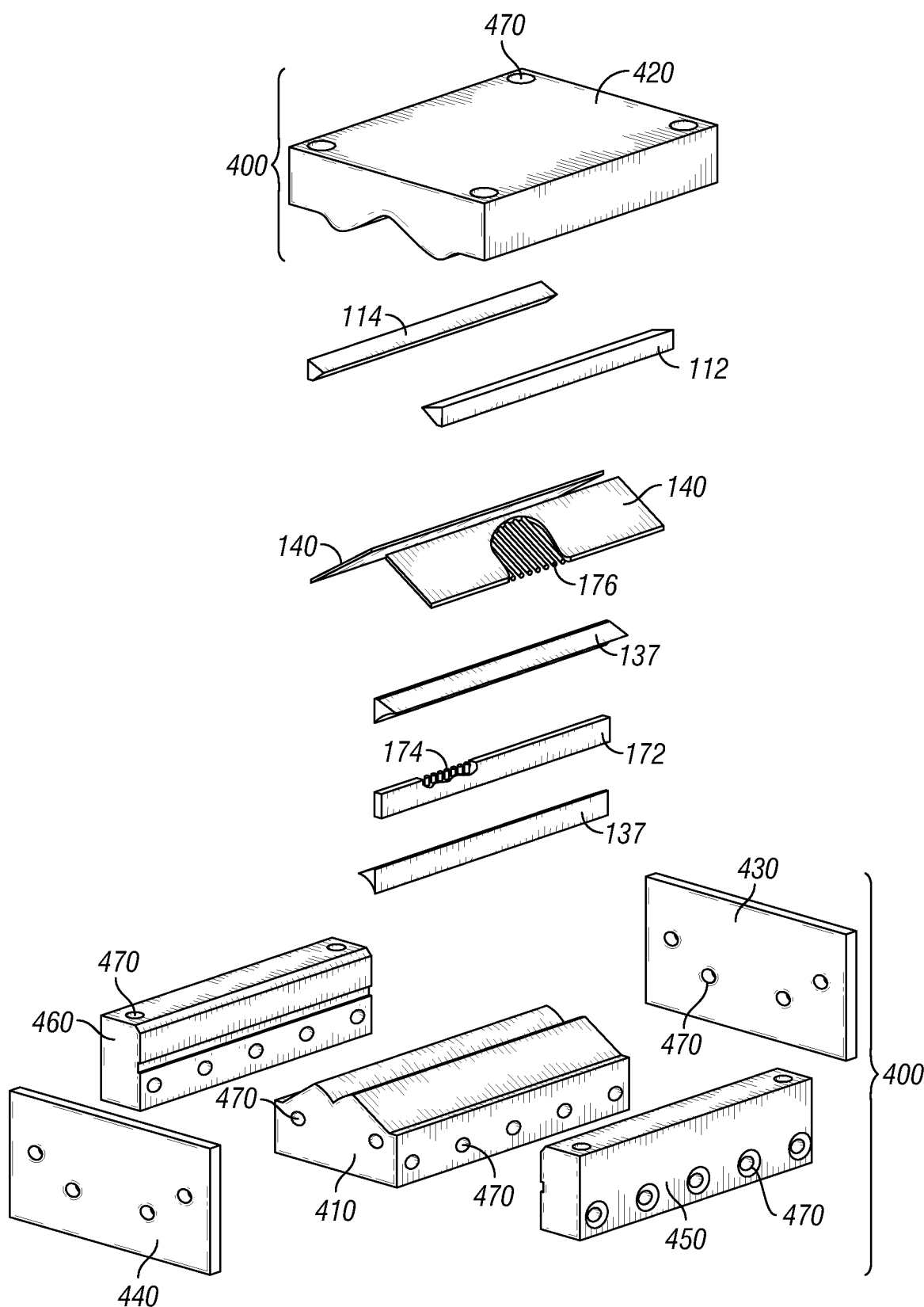
FIG. 17 provides a perspective view of an alternative exemplary embodiment of a mold used for forming an alternative spoke embodiment of the invention. The resilient composite structure's components are shown, with some components having a portion of the elastic material removed to show reinforcement location and orientation.

FIG. 17 shows an exploded perspective view of an alternative mold 400, 410, 420, 430, 440, 450, 460 used to manufacture an alternative embodiment of individual spoke 100. The spoke components are shown separated as they are placed into the mold. Some of the spoke components show the orientation of the reinforcement fibers and cords. For example, the elastomeric joint body 136 reinforcements 174 are shown in the partial cutaway view of that component. The reinforcements 174 are shown in this embodiment to run parallel to one another and along the width of the reinforcement membrane 172. Both of the legs 140, 142, 144 are shown and the radially inner leg 142 is shown with a partial cut-away showing the composite glass resin reinforcements 176 positioned parallel to one another and along the width of the radially inner leg 140. The reinforcements 176 of the legs 140 and the reinforcements 174 of the elastomeric joint body 136 are resiliently flexible. Note that in this particular embodiment, the nose membrane reinforcement 132 is omitted. Alternatively both the nose membrane reinforcement 132 may be included in combination with the elastomeric joint body reinforcement 172.

Once the various uncured components are laid in place over the mold bottom 410, the mold 400 is closed and secured. Here the mold is closed with screw fasteners through apertures 470 and secured to threaded portions of the apertures 470 of the mold components. Tightening of the fasteners exert pressure, or/and additional pressure may be applied to the mold top during curing. Heating of the mold 400 heats the rubber components within and cures the rubber, adheres the rubber components together and forms a composite spoke having excellent resilient qualities of sufficient durability for use as a structural element in an automotive non-pneumatic tire. Other uses for the resilient composite structure may include vibration isolation mounts, such as motor mounts, transmission mounts or seat mounts, or used as a resilient hinge to allow movement of one object relative to another object otherwise connected by the resilient composite structure.

The "V-shape" of the embodiments of the spoke shown and described herein allow the adjacent spokes to "nest" and give linear spring rate when deflected radially over a distance approximately equal to the tires vertical deflection. The nesting of the spokes avoid adjacent spokes from clashing under normal loading conditions.

It should be understood by a person of ordinary skill in the art that the stiffness of the spoke may be adjusted by adjusting the length of the "V" of the "Vshaped spoke", the constituent material moduli and the internal architecture of the spoke.

It should be understood that other web element configurations and geometries may be used within the scope of the invention, including web elements which are interconnected such as where they may form a honeycomb or other pattern. While when the resilient composite structure is configured as a spoke they are configured to extend in a lateral direction across the width of the tire, it should be understood that they may be configured at other angles, such as at an angle to the lateral direction of the tire. For example, the spoke may extend at a diagonal between the circumferential direction and the lateral direction of the tire.

The invention is further illustrated by the following examples, which are to be regarded only as illustrations and not delimitative of the invention in any way. The properties of the compositions disclosed in the examples were evaluated as described below and these utilized methods are suitable for measurement of the claimed properties of the claimed invention.

Modulus of elongation (MPa) was measured at 10% (MA10) or 100% (MA100) at a temperature of 23° C. based on ASTM Standard D412 on dumb bell test pieces. The measurements were taken in the second elongation; i.e., after an accommodation cycle. These measurements are secant moduli in MPa, based on the original cross section of the test piece.

The dynamic properties for the rubber compositions were measured at 23° C. on a Metravib Model VA400 ViscoAnalyzer Test System in accordance with ASTM D5992-96. The response of a sample of vulcanized material (double shear geometry with each of the two 10 mm diameter cylindrical samples being 2 mm thick) was recorded as it was being subjected to an alternating single sinusoidal shearing stress at a frequency of 10 Hz under a controlled temperature of 23° C. Scanning was effected at an amplitude of deformation of 0.05 to 90% (outward cycle) and then of 90% to 0.05% (return cycle). The value of the tangent of the loss angle tan delta was determined during the outward cycle at its maximum value, at 50% strain. The complex shear modulus G* was determined at 50% strain during the outward cycle.

The elongation property was measured as elongation at break (%) and the corresponding elongation stress (MPa), which is measured at 23° C. in accordance with ASTM Standard D412 on ASTM C test pieces.

The tear resistance indices are measured at 23° C. The breaking load (FRD) is in N/mm of thickness and the elongation at break (ARD) in percentage are measured on a test piece of dimensions 10×142×2.5 mm notched with 3 notches that each have a depth of 3 mm. The tear resistance index is then provided by the following equation:

$$TR = (FRD * ARD)/100.$$

Example 1

Rubber compositions were prepared using the components shown in Table 1. The amount of each component making up the rubber compositions are provided in parts er hundred part of rubber by weight (phr).

The carbon blacks were N650 having a surface area of 35 m²/g (surface areas being STSA in accordance with ASTM D-6556), N326 having a surface area of 76 m²/g and N347 having a surface area of 83 m²/g. The silica was Silene 732D a powder having a surface area of 35 m²/g from PPG. CTP is N-(cyclohexylthio)phthalimide, a retarder for sulfur-cured elastomers.

The wt % ratio of carbon black to silica for rubber formulation F1 is 53% to 47%. The total phr of silica (17 phr) and carbon black (15 phr) is 32 phr and 17/32 is 53% and 15/32 is 47 providing the ratio of 53% to 47%.

The antioxidant package included 6ppd, TMQ and wax. Formulation F3 included a methylene donor/acceptor reinforcing system, which is well known to those in the art.

The rubber formulations were prepared by mixing the components given in Table 1, except for the accelerators and sulfur, in a Banbury mixer until a temperature of between 110° C. and 170° C. was reached. The accelerators and sulfur were added in the second phase on a mill. Vulcanization was effected at 150° C. for 15 minutes. The formulations were then tested to measure their properties, the results of which are shown in Table 1.

As can be seen from Table 2, both F1 and F2 had very low hysteresis but the F2 formulation for the joint bodies provided a higher resistance to tear. The heel formulations F3 and F4, provided the highest hysteresis but the highest resistance to tear.

TABLE 1

Rubber Formulations

| | Formulations | | | |
|---|---|---|---|---|
| | F1 | F2 | F3 | F4 |
| | | Service | | |
| | Coating | Joints | Heel | Heel |
| NR | 70 | 100 | 100 | 100 |
| BR | 30 | | | |
| N650 | 15 | 4 | | |
| N347 | | | | 50 |
| N326 | | | 52 | |
| Silica | 17 | 30 | | |
| Si69 | 0.43 | 0.56 | | |
| HMT | | | | 0.8 |
| Resin Hard FP | | | | 4 |
| Paraffinic Oil | | | 2 | 4 |
| DPG | 0.05 | 0.07 | | |
| Antioxidants | 5.7 | 8.1 | 1.5 | 2 |
| CTP | 0.2 | 0.3 | 0.15 | 0.15 |
| Zinc Oxide | 3 | 3 | 8 | 8 |
| Stearic Acid | 1 | 0.5 | 0.6 | 0.65 |
| Sulfur Cure Package | 9.1 | 7.1 | 6.3 | 8.5 |

TABLE 2

Physical Properties

| | Formulations | | | |
|---|---|---|---|---|
| Phys. Properties | F1 | F2 | F3 | F4 |
| MA10, MPa | 3.81 | 3.24 | 6.00 | 10.0 |
| MA100, MPa | 2.51 | 2.22 | 2.60 | 4.43 |
| TanD (50%, 23° C.) | 0.0217 | 0.0210 | 0.110 | 0.140 |
| G*50%, MPa | 1.35 | 1.19 | 1.60 | 2.20 |
| Strain at Break, % | 209 | 449 | 540 | 408 |
| Tear Stress @ 23° C., MPa | 13.30 | 20.9 | 66.3 | 62.9 |
| Tear Strain at break @ 23° C., % | 51 | 98.0 | 251.0 | 150.0 |
| Tear Index | 6.78 | 20.5 | 166.3 | 94.3 |

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention. Ranges that are described as being "between a and b" are inclusive of the values for "a" and "b." It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

What is claimed is:

1. A non-pneumatic wheel, comprising a hub, an outer tread band and a plurality of spokes connecting the hub with the outer tread band, wherein each spoke of the plurality of spokes comprises:
    a first support element extending from the hub and a second support element extending from the tread band that are positioned to form an interior angle, which is an angle of greater than 0 degrees but less than 180 degrees, between a first side of the first support element and a first side of the second support element, wherein the first and second support elements comprise a coating of a first rubber composition;
    a first elastomeric joint body formed of a second rubber composition and positioned within the interior angle and connecting the distal ends, the distal ends being those that are opposite from the hub and the tread band ends respectively, of the first and second support elements;

a second elastomeric joint body comprising a third rubber composition and connecting a second side of the first support element at its proximal end to the hub;

a third elastomeric joint body comprising a fourth rubber composition and connecting a second side of the second support element at its proximal end to the band, wherein the proximal ends of the first and second support elements are otherwise free ends, and wherein the first, second, third, and fourth rubber compositions are based on cross-linkable rubber compositions, the first rubber composition comprising, in parts by weight per 100 parts by weight of rubber:

between 50 phr and 100 phr of natural rubber;

between 0 phr and 50 phr of a second rubber component selected from the group consisting of polybutadiene rubber, a copolymer of polybutadiene and styrene wherein the copolymer has no more than 5 mol % styrene and combinations thereof;

between 25 phr and 40 phr of a first reinforcing filler that comprises a first carbon black and a first silica at a carbon black to silica ratio of between 60/40 and 30/70 by weight percent, wherein the first carbon black has a surface area of between 19 $m^2/g$ and 39 $m^2/g$; and a first cure system; and wherein the second, third and fourth rubber compositions, which may be the same or different, comprise, in parts by weight per 100 parts by weight of rubber:

between 50 phr and 100 phr of natural rubber;

between 0 phr and 50 phr of a third rubber component selected from the group consisting of polybutadiene rubber, a copolymer of polybutadiene and styrene wherein the copolymer has no more than 5 mol % styrene and combinations thereof;

between 15 phr and 40 phr of a second reinforcing filler that comprises between 2 phr and 6 phr of a second carbon black and between 20 phr and 40 phr of a second silica, wherein the second carbon black has a surface area of between 19 $m^2/g$ and 39 $m^2/g$; and one or more cure systems for the second, third and fourth rubber compositions, which cure systems may be the same or different.

2. The non-pneumatic wheel of claim 1, wherein at least one of the second and third elastomeric joint bodies further comprise a heel at the proximal end of the elastomeric joint bodies, wherein the heel is formed of a fifth rubber composition, wherein the heel is no more than 25% of the total volume of the at least one of the second and third elastomeric joint bodies, and wherein the fifth rubber composition that forms the heel is based on cross-linkable rubber compositions which may be the same or different for each heel, the fifth rubber composition comprising, in parts by weight per 100 parts by weight of rubber:

between 90 phr and 100 phr of natural rubber;

up to 10 phr of a third rubber component selected from the group consisting of polybutadiene rubber, a copolymer of polybutadiene and styrene wherein the copolymer has no more than 5 mol % styrene and combinations thereof;

between 40 phr and 60 phr of a third reinforcing filler; and a cure system for the fifth rubber compositions.

3. The non-pneumatic wheel of claim 2, further comprising a reinforcement membrane connecting the second side of the first support element and the second side of the second support element at their distal ends.

4. The non-pneumatic wheel of claim 3, wherein the first support element and the second support element each further comprise one or more reinforcements coated with the first rubber composition.

5. The non-pneumatic wheel of claim 4, wherein the one or more reinforcements for each of the first and second support elements are cords of fiber reinforced plastic oriented between the distal and proximal ends of each of the first and second support elements.

6. The non-pneumatic wheel of claim 5, wherein the first rubber composition includes 100 phr of natural rubber.

7. The non-pneumatic wheel of claim 6, wherein the carbon black to silica ratio of the first rubber composition is between 55/45 and 45/55 by weight percent.

8. The non-pneumatic wheel of claim 7, wherein the at least one of the first silica and second silica has a surface area of between 25 $m^2/g$ and 39 $m^2/g$.

9. The non-pneumatic wheel of claim 8, wherein one or more of the second, third and fourth rubber compositions includes 100 phr of natural rubber.

10. The non-pneumatic wheel of claim 9, wherein one or more of the second, third and fourth rubber compositions includes between 25 phr and 35 phr of the second silica.

11. The non-pneumatic wheel of claim 1, further comprising a reinforcement membrane connecting the second side of the first support element and the second side of the second support element at their distal ends.

12. The non-pneumatic wheel of claim 1, wherein the first support element and the second support element each further comprise one or more reinforcements coated with the first rubber composition.

13. The non-pneumatic wheel of claim 12, wherein the one or more reinforcements for each of the first and second support elements are cords of fiber reinforced plastic oriented between the distal and proximal ends of each of the first and second support elements.

14. The non-pneumatic wheel of claim 1, wherein the first rubber composition includes 100 phr of natural rubber.

15. The non-pneumatic wheel of claim 1, wherein the carbon black to silica ratio of the first rubber composition is between 55/45 and 45/55 by weight percent.

16. The non-pneumatic wheel of claim 1, wherein the at least one of the first silica and second silica has a surface area of between 25 $m^2/g$ and 39 $m^2/g$.

17. The non-pneumatic wheel of claim 1, wherein one or more of the second, third and fourth rubber compositions includes 100 phr of natural rubber.

18. The non-pneumatic wheel of claim 1, wherein one or more of the second, third and fourth rubber compositions includes between 25 phr and 35 phr of the second silica.

19. The non-pneumatic wheel of claim 1, wherein the fifth rubber composition includes 100 phr of natural rubber.

20. The non-pneumatic wheel of claim 1, wherein the fifth rubber composition reinforcing filler is carbon black.

* * * * *